United States Patent [19]

Kubo

[11] Patent Number: 4,656,588
[45] Date of Patent: Apr. 7, 1987

[54] ANTI-SKID BRAKE CONTROL SYSTEM WITH A PLURALITY OF INDEPENDENTLY OPERATIVE DIGITAL CONTROLLERS

[75] Inventor: Jun Kubo, Hino, Japan

[73] Assignee: Nissan Motor Company, Limited, Yokohama, Japan

[21] Appl. No.: 601,295

[22] Filed: Apr. 17, 1984

[51] Int. Cl.⁴ .............................................. B60T 8/32
[52] U.S. Cl. ...................................... 364/426; 303/92; 303/95
[58] Field of Search ........................ 364/426, 565, 566; 303/95, 105–109; 180/179; 361/238

[56] References Cited

U.S. PATENT DOCUMENTS

| | | | |
|---|---|---|---|
| 2,914,359 | 11/1959 | Yarber | 303/24 B |
| 3,398,995 | 8/1968 | Martin | 303/105 |
| 3,503,653 | 3/1970 | Davis et al. | 303/95 |
| 3,637,264 | 1/1972 | Leiber et al. | 303/105 |
| 3,752,536 | 8/1973 | Machek | 303/115 |
| 3,930,688 | 1/1976 | Rau et al. | 364/426 |
| 3,938,612 | 2/1976 | Boudeville et al. | 364/426 |
| 3,943,345 | 3/1976 | Ando et al. | 364/566 |
| 3,985,396 | 10/1976 | Kuwana et al. | 364/426 |
| 4,267,575 | 5/1981 | Bounds | 364/565 |
| 4,315,213 | 2/1982 | Wolff | 364/565 |
| 4,374,421 | 2/1983 | Leiber | 364/426 |
| 4,408,290 | 10/1983 | Kubo et al. | 364/566 |
| 4,420,191 | 12/1983 | Arikawa et al. | 364/426 |
| 4,435,768 | 3/1984 | Arikawa et al. | 364/426 |
| 4,499,543 | 2/1985 | Matsuda | 364/426 |
| 4,530,059 | 7/1985 | Brearley et al. | 364/426 |
| 4,546,437 | 10/1985 | Bleckmann et al. | 364/426 |
| 4,569,560 | 2/1986 | Kubo | 303/92 |

Primary Examiner—Gary Chin
Attorney, Agent, or Firm—Schwartz, Jeffery, Schwaab, Mack, Blumenthal & Evans

[57] ABSTRACT

An anti-skid brake control system includes a plurality of controllers adapted to control the braking pressure on corresponding vehicle wheels. Each controller receives wheel speed sensor signals from a corresponding wheel speed sensor and derives the rotation speed of the corresponding wheel or wheels. The controller detects failure of the wheel speed sensor to perform a back-up operation in order to continue braking control. The controllers are mutually independent with regard to anti-skid brake control and, on the other hand, are mutually cooperative with regard to the back-up operation when one of the wheel speed sensors fails. The back-up operation includes switching the operation mode of the vehicle brake system from controlled mode to manual mode. Switching of operation mode from the controlled mode to manual mode is performed in each controller at a predetermined timing.

22 Claims, 26 Drawing Figures

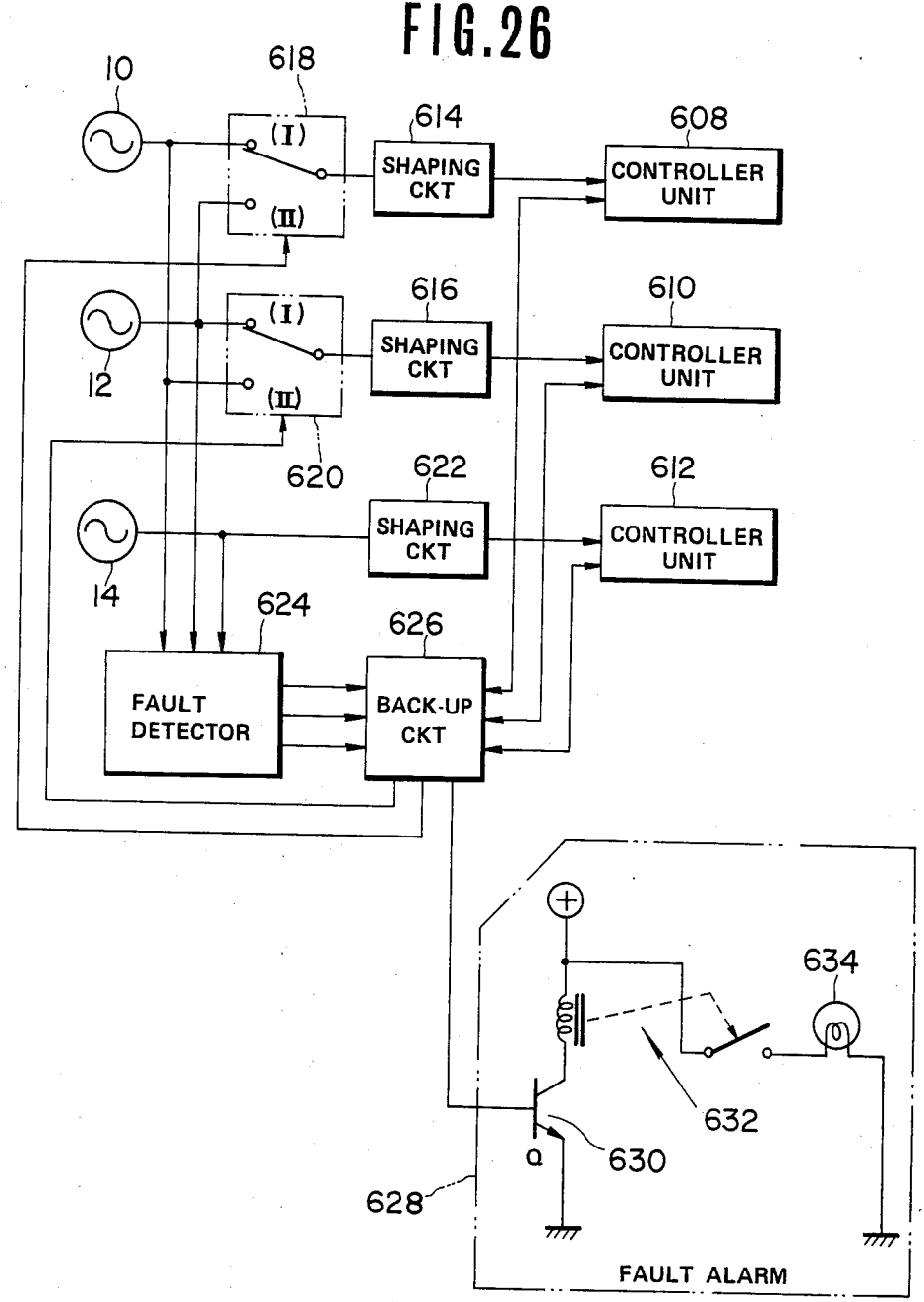

ANTI-SKID BRAKE CONTROL SYSTEM WITH A PLURALITY OF INDEPENDENTLY OPERATIVE DIGITAL CONTROLLERS

BACKGROUND OF THE INVENTION

The present invention relates generally to a digital control system for an automotive hydraulic brake system which prevents the vehicle wheels from locking up or skidding. More particularly, the invention relates to an anti-skid brake control system having a plurality of microprocessors which can operate independently to independently perform anti-skid control for corresponding vehicle wheel or wheels.

Various kinds of anti-skid automotive brake control systems are now available. Anti-skid brake control systems generally control braking pressure at wheel cylinder or wheel cylinders in order to hold wheel slip relative to vehicle speed as close as possible to an optimal rate. In order to accomplish this, various approaches have been taken in the prior art.

U.S. Pat. No. 4,315,213, issued on Feb. 9, 1982 to Manfred WOLFF, discloses a method for obtaining an acceleration or deceleration signal from a signal proportional to speed and apparatus therefor. The method for obtaining an acceleration or deceleration signal from a signal proportional to the speed consists of storing the n most recently ascertained changes in the speed signal in a memory, and upon ascertainment of a new change to be stored in memory, erasing the change which has been stored the longest, and forming a deceleration or acceleration signal by addition of the stored n changes periodically at intervals of dT. In this method, the occurrence of deceleration or acceleration exceeding the threshold is recognized quickly.

U.S. Pat. No. 4,267,575, issued on May 12, 1981 to Peter BOUNDS, discloses a system, which serves to provide signals to a microcomputer-based control system from which instantaneous values of speed can be computed, includes a wheel-driven alternator which provides an alternating current output whose frequency varies with wheel speed. A signal processor converts this signal to a series of sensor pulses whose width varies inversely with frequency. A sample pulse supplied by a microprocessor sets the period or length of time during which the sensor pulses are examined for each speed calculation cycle of the microprocessor. The sample period pulses are AND-gated with a high-frequency clock signal and also with the sensor pulses to provide a series of marker pulses marking the up and down excursions of the sensor pulses. The marker pulses occurring in each sample period are counted directly in a first counter, and in addition are supplied to a latch circuit and from thence to an AND gate which responds to the first marker pulse in the sample period to count occurrences of the first counter exceeding its capacity. A third counter is also connected to receive the high-frequency clock pulses and counts only the clock pulses occurring after the last marker pulse in the sample period. At the end of the sample period, the counts from all three counters are transferred to the microprocessor which uses this information to compute a value for wheel velocity over the sample period. The system continuously provides the input counts to enable the microprocessor to calculate wheel velocity over each sample period.

In another approach, U.S. Pat. No. 4,384,330 to Toshiro MATSUDA, issued on May 17, 1983 discloses a brake control system for controlling application and release of brake pressure in order to prevent the vehicle from skidding. The system includes a sensing circuit for determining wheel rotation speed, a deceleration detecting circuit for determining the deceleration rate of the wheel and generating a signal when the determined deceleration rate becomes equal to or greater than a predetermined value, a target wheel speed circuit for determining a target wheel speed based on the wheel rotation speed and operative in response to detection of a peak in the coefficient of friction between the vehicle wheel and the road surface, and a control circuit for controlling application and release of brake fluid pressure to wheel cylinders for controlling the wheel deceleration rate. The wheel rotation speed sensing circuit detects the angular velocity of the wheel to produce alternating current sensor signal having a frequency corresponding to the wheel rotation speed. The wheel rotation speed sensor signal value is differentiated to derive the deceleration rate.

Another approach for deriving acceleration has been disclosed in U.S. Pat. No. 3,943,345 issued on Mar. 9, 1976 to Noriyoshi ANDO et al. The system disclosed includes a first counter for counting the number of pulse signals corresponding to the rotational speed of a rotating body, a second counter for counting the number of pulses after the first counter stops counting, and a control circuit for generating an output signal corresponding to the difference between the counts of the first and second counters.

In the present invention, another approach has been taken to derive the wheel rotation speed which will be hereafter referred to as "wheel speed" based on input time data representative of the times at which wheel speed sensor signal pulses are produced. For instance, by latching a timer signal value in response to the leading edge of each sensor signal pulse, the intervals between occurrences of the sensor signal pulses can be measured. The intervals between occurrences of the sensor signal pulses are inversely proportional to the rotation speed of the wheel. Therefore, wheel speed can be derived by finding the reciprocal of the measured intervals. In addition, wheel acceleration and deceleration can be obtained by comparing successive intervals and dividing the obtained difference between intervals by the period of time over which the sensor signals were sampled.

To perform this procedure, it is essential to record the input timing in response to every sensor signal pulse. A difficulty is encountered due to significant variations in the sensor signal intervals according to significant variations in the vehicle speed. In recent years, modern vehicles can be driven at speeds in the range of about 0 km to 300 km. Sensor signal intervals vary in accordance with this wide speed range. In particular, when the vehicle is moving at a relatively high speed, the input intervals of the sensor signal pulses may be too short for the anti-skid control system to resolve. As accurate sampling of input timing is essential for the proposed approach, errors in the recorded input time data will cause errors or malfunction of the anti-skid brake control system. One possible source of error in sampling the input timing is accidentally missing one or more sensor signal pulses. Such errors are particularly likely to occur when the vehicle and wheel speeds are relatively high and therefore the intervals between adjacent sensor signal pulses are quite short.

U.S. Pat. No. 4,408,290, issued on Oct. 4, 1983 to the common invertor of this invention is intended to perform the foregoing input time data sampling for use in calculation of acceleration and deceleration. In the disclosure of the applicant's prior invention, an acceleration sensor acts on the variable-frequency pulses of a speed sensor signal to recognize any variation of the pulse period thereof and to produce an output indicative of the magnitude of the detected variation to within a fixed degree of accuracy. The durations of groups of pulses are held to within a fixed range by adjusting the number of pulses in each group. The duration of groups of pulses are measured with reference to a fixed-frequency clock pulse signal and the measurement periods of successive groups of equal numbers of pulses are compared. If the difference between pulse group periods is zero or less than a predetermined value, the number of pulses in each group is increased in order to increase the total number of clock pulses during the measurement interval. The number of pulses per group is increased until the difference between measured periods exceeds the predetermined value or until the number of pulses per group reaches a predetermined maximum. Acceleration data calculation and memory control procedure are designed to take into account the variation of the number of pulse per group.

In such anti-skid brake control systems, it is essential to provide accurate wheel speed sensor signals as all of the control operations are performed in accordance with parameters derived from the wheel speed sensor signals. On the other hand, since the wheel speed sensor is usually installed opposite the vehicle wheel in order to detect the rotation speed thereof, it is susceptible to damage during operation and the harness or wiring connecting the wheel speed sensor to the control module may possibly be damaged. If the control module fails to receive wheel speed sensor signals, it becomes impossible to perform anti-skid control. In the worst case, when the wheel speed sensor fails while the antiskid control system is in release mode, the pressure control valve may remain in release mode indefinitely, thus supplying a reduced or negligible fluid pressure to the wheel cylinder.

Therefore, for safety, it is essential to provide a failsafe system or back-up system which can perform braking even when the wheel speed sensor fails.

SUMMARY OF THE INVENTION

It is a general and principle object of the present invention to provide an anti-skid brake control system including a plurality of independently operable control systems for independently controlling braking pressure to corresponding wheels.

Another and more specific object of the present invention is to provide an anti-skid brake control system which includes a plurality of control systems acting independently to control braking pressure of the corresponding hydraulic brake circuit and cooperating to perform fail-safe or back-up operations when the wheel speed sensor corresponding to one of control systems fails.

A further specific object of the present invention is to provide an anti-skid brake control system applicable for a vehicle having a front-engine, rear-wheel-drive arrangement, which control system assures security in braking.

To accomplish the above-mentioned and other objects, an anti-skid brake control system, according to the present invention, includes a plurality of controllers adapted to control braking pressure for corresponding vehicle wheel or wheels. Each controller receives a wheel speed sensor signal from a corresponding wheel speed sensor in order to measure the rotation speed of the corresponding wheel. The controller responds to failure of the wheel speed sensor by performing back-up operations in order to continue braking. The controllers perform anti-skid brake control operations mutually independently and, on the other hand, perform back-up operations when one of the wheel speed sensor fails mutually cooperatively.

Preferably, back-up operations includes a procedure for switching the operation mode of the vehicle brake system from a controlled mode to a manual mode. Switching of the operation mode from the controlled mode to the manual mode is performed by each controller at a predetermined timing. In the preferred procedure, switching of the operation mode is performed by all of the controllers after one wheel speed sensor fails upon completion of the current skid control operation.

BRIEF DESCRIPTION OF THE DRAWINGS

The present invention will be understood more fully from the detailed description given herebelow and from the accompanying drawings of the preferred embodiments of the invention, which, however, should not be taken to limit the invention thereto but are for explanation and understanding only.

In the drawings:

FIG. 26 is a step diagram of yet another embodiment of the anti-skid brake control system of the present invention.

DESCRIPTION OF THE PREFERRED EMBODIMENTS

Figure 1:
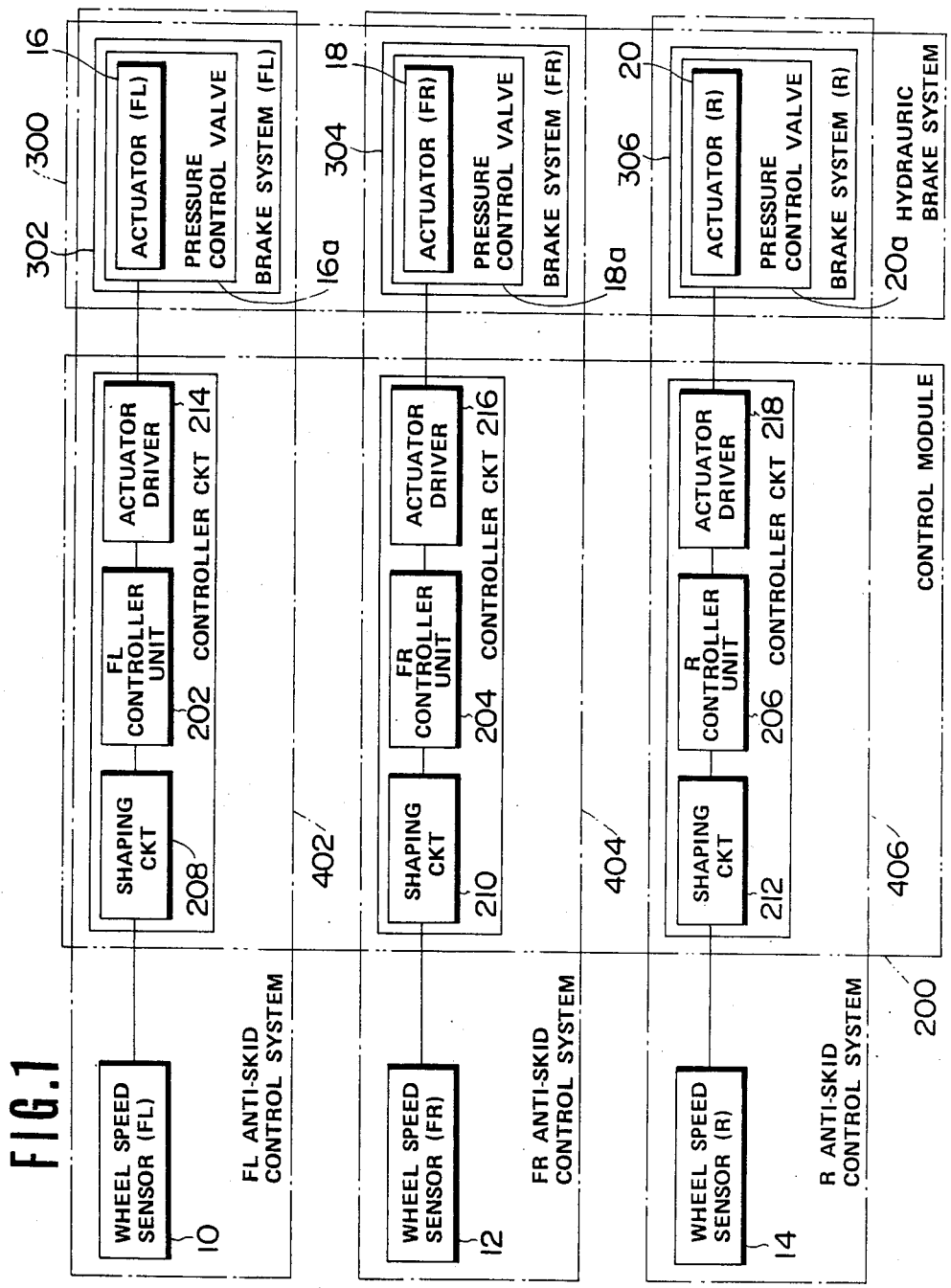
FIG. 1 is a schematic step diagram of the preferred embodiment of an anti-skid brake control system according to the present invention.

This application is one of eighteen mutually related co-pending Patent Applications in the United States, filed on the same day. All of the eighteen applications have been filed by the common applicant to this application and commonly assigned to the assignee of this application. The other seventeen applications are identified below:

| Basic Japanese Patent Appln. No. | U.S. Serial No. | Title of the Invention |
| --- | --- | --- |
| Showa 58-70891 | 601,326 | AN AUTOMOTIVE ANTI-SKID BRAKE CONTROL SYSTEM WITH SAMPLING INPUT TIME DATA OF WHEEL SPEED SENSOR SIGNALS |
| Showa 58-70892 (filed April 23, 1983) | 601,375 | METHOD AND SYSTEM FOR SAMPLING INPUT TIME DATA FOR WHEEL SPEED SENSOR IN AN AUTOMOTIVE ANTI-SKID BRAKE CONTROL SYSTEM |
| Showa 58-70893 (filed April 23, 1983) | 601,325 | AUTOMOTIVE ANTI-SKID CONTROL SYSTEM WITH CONTROL OF SAMPLING OF INPUT TIME DATA OF WHEEL SPEED SENSOR SIGNALES AND METHOD THEREFOR |
| Showa 58-70894 (filed April 23, 1983) | 601,317 | ANTI-SKID CONTROL SYSTEM FOR AUTOMOTIVE BRAKE SYSTEM WITH SAMPLE CONTROL FOR SAMPLING INPUT TIMING OF SENSOR SIGNAL PULSES WITH REQUIRED PROCESS IDENTIFICATION AND METHOD FOR SAMPLING |
| Showa 58-70895 (filed April 23, 1983) | 601,294 | ANTI-SKID BRAKE CONTROL SYSTEM INCLUDING A PROCEDURE OF SAMPLING OF INPUT TIME DATA OF WHEEL SPEED SENSOR SIGNALS AND METHOD THEREFOR |
| Showa 58-70896 (filed April 23, 1983) | 601,344 | ANTI-SKID BRAKE CONTROL SYSTEM INCLUDING WHEEL DECELERATION CALCULATION WITH SHORTER LAG-TIME AND METHOD FOR PERFORMING CALCULATION |
| Showa 58-70897 (filed April 23, 1983) | 601,338 | ANTI-SKID BRAKE CONTROL SYSTEM WITH SAMPLE CONTROL OF SENSOR SIGNAL INPUT TIME DATA, AND METHOD THEREFOR |
| Showa 58-70898 (filed April 23, 1983) | 601,337 | ANTI-SKID BRAKE CONTROL SYSTEM WITH CONTROL OF SAMPLING TIMING OF INPUT TIMING VALUES OF WHEEL SPEED SENSOR SIGNAL PULSES |
| Showa 58-70899 (filed April 23, 1983) | 601,330 | ANTI-SKID BRAKE CONTROL SYSTEM FOR AUTOMOTIVE VEHICLE |
| Showa 58-70900 (filed April 23, 1983) | 601,364 | ANTI-SKID BRAKE CONTROL SYSTEM WITH REDUCED DURATION OF WHEEL ACCELERATION AND DECELERATION CALCULATION |
| Showa 58-84088 (filed May 16, 1983) | 601,363 | ANTI-SKID BRAKE CONTROL SYSTEM WITH OPERATIONAL MODE CONTROL AND METHOD THEREFOR |
| Showa 58-84087 & 58-84091 (both filed May 16, 1983) | 601,329 | ANTI-SKID BRAKE CONTROL SYSTEM WITH OPERATION CONTROL FOR A PRESSURE REDUCTION FLUID PUMP IN HYDRAULIC BRAKE CIRCUIT |
| Showa 58-84082 (filed May 16, 1983) | 601,318 | METHOD AND SYSTEM FOR DERIVING WHEEL ROTATION SPEED DATA FOR AUTOMOTIVE ANTI-SKID CONTROL |
| Showa 58-84085 (filed May 16, 1983) | 601,345 | METHOD AND SYSTEM FOR DERIVING WHEEL ACCELERATION AND DECELERATION IN AUTOMOTIVE ANTI-SKID BRAKE CONTROL SYSTEM |
| Showa 58-84092 (filed May 16, 1983) | 601,293 | ANTI-SKID BRAKE CONTROL SYSTEM AND METHOD FEATURING VEHICLE BATTERY PROTECTION |
| Showa 58-84081 (filed May 16, 1983) | 601,327 | METHOD AND SYSTEM FOR DERIVING WHEEL ROTATION SPEED DATA FOR AUTOMOTIVE ANTI-SKID CONTROL |
| Showa 58-84090 (filed May 16, 1983) | 601,258 | ANTI-SKID BRAKE CONTROL SYSTEM INCLUDING FLUID PUMP AND DRIVE CIRCUIT THEREFOR |

The contents of the seventeen applications identified above are hereby incorporated by reference.

Referring now to the drawings, particularly to FIGS. 1 to 10, the preferred embodiment of an anti-skid brake control system, according to the present invention, includes three controller units 202, 204 and 206, each of which comprises a microprocessor. The controller units 202, 204 and 206 are housed in a common housing and form a control module 200 of the anti-skid control system. As shown in FIG. 1, a hydraulic brake circuit 300 includes three independently operative brake systems 302, 304 and 306. As the embodiment shown is illustrated as applied to a front-engine, rear-wheel-drive automotive vehicle, the brake system 302 is adapted to apply braking force to a front left wheel (FL), the brake system 304 is adapted to apply braking force to a front right wheel (FR) and the brake system 306 is adapted to apply braking force to rear wheels (R). Thus, the driven rear wheels are controlled in tandem while the undriven front wheels are controlled individually.

It should be noted that although the embodiment shown has been directed to an anti-skid brake control system applicable to front-engine, rear-wheel-drive vehicles, the invention is applicable to vehicles of any of the various drive train arrangements, such as a vehicle with a front-engine, front-wheel-drive arrangement or a four-wheel-drive arrangement.

The controller unit 202 is associated with the brake system 302 (FL) for controlling the braking force to be applied to a front-left wheel cylinder (not shown: see 30a of FIG. 2) and thus performs anti-skid brake control at the front-left wheel. The controller unit 204 is associated with the brake system 304 (FR) for controlling the braking force to be applied to a front-right wheel cylinder (not shown: see 34a of FIG. 2) and thus performs anti-skid control at the front-right wheel. The controller unit 206 is associated with the brake system 306 (R) for controlling the braking force to be applied to the rear wheel cylinders (not shown: see 38a of FIG. 2) and thus performs anti-skid control at the rear wheels.

The controller unit 202 is connected to a wheel speed sensor 10 to receive sensor signal pulses separated by intervals corresponding to the rotation speed of front-left wheel. The controller unit 202 is further connected to an electromagnetic actuator 16 which controls operation of an electromagnetic valve 16a disposed in the brake system 302. The controller unit 202, the brake system 302 and the wheel speed sensor 10 constitute a front-left anti-skid brake control system 402. Likewise, the controller unit 204 is connected to a wheel speed sensor 12 to receive sensor signal pulses representative of the rotation speed of the front-right wheel and to an electromagnetic actuator 18 of an electromagnetic valve 18a disposed in the brake system 304. The controller unit 206 is also connected to a wheel speed sensor 14 to receive sensor signal pulses representative of the average rotation speed of the rear wheels. As in the front-left anti-skid control system 402, a front-right anti-skid control system 404 is constituted by the controller unit 204, the brake system 304 and the wheel speed sensor 12. Also, a rear wheel anti-skid control system 406 is constituted by the controller unit 206, the brake system 306 and the wheel speed sensor 14. Respective electromagnetic actuators 16, 18 and 20 control the pressure of working fluid in the corresponding wheel cylinders. By means of the controlled pressure, the wheel cylinders 30a, 34a and 38a apply braking force to brake disc rotors 28, 32 and 36 mounted on the corresponding wheel axles for rotation with the corresponding vehicle wheels via brake shoe assemblies 30, 34 and 38.

Though the shown brake system comprises disc brakes, the anti-skid control system according to the present invention can also be applied to drum-type brake systems.

The controller units 202, 204 and 206 are respectively associated with actuator drive circuits 214, 216 and 218 to control operations of corresponding actuators 16, 18 and 20. In addition, each of the controller units 202, 204 and 206 is connected to a corresponding wheel speed sensor 10, 12 and 14 via shaping circuits 208, 210 and 212 incorporated in the controller 200. Each of the wheel speed sensors 10, 12 and 14 is adapted to produce an alternating-current sensor signal having a frequency related to or proportional to the rotation speed of the corresponding vehicle wheel. Each of the A-C sensor signals is converted by the corresponding shaping circuit 208, 210 and 212 into a rectangular pulse signal which will be hereafter referred to as "sensor pulse signal". As can be appreciated, since the frequency of the A-C sensor signals is proportional to the wheel speed, the frequency of the sensor pulse signal should correspond to the wheel rotation speed and the pulse intervals thereof will be inversely proportional to the wheel rotation speed.

The controller units 202, 204 and 206 operate independently and continuously process the sensor pulse signal to derive control signals for controlling the fluid pressure in each of the wheel cylinders 30a, 34a and 38a in such a way that the slip rate R at each of the vehicle wheels is optimized to shorten the distance required to stop the vehicle, which distance will be hereafter referred to as "braking distance".

In general, each controller unit 202, 204 and 206 monitors receipt of the corresponding sensor pulses so that it can derive the pulse interval between the times of receipt of successive sensor pulses. Based on the derived pulse interval, the controller units 202, 204 and 206 calculate instantaneous wheel speed $V_w$ and instantaneous wheel acceleration or deceleration $a_w$. From these measured and derived values, a target wheel speed $V_i$ is derived, which is an assumed value derived from the wheel speed at which a slip is assumed to be zero or approximately zero. The target wheel speed $V_i$ varies at a constant decelerating rate derived from variation of the wheel speed. The target wheel speed is thus corresponds to a vehicle speed which itself is based on variation of the wheel speed. Based on the difference between the instantaneous wheel speed $V_w$ and the target wheel speed $V_i$, a slip rate R is derived. The controller units 202, 204 and 206 determine the appropriate operational mode for increasing, decreasing or holding the hydraulic brake pressure applied to the wheel cylinders 30a, 34a and 38a. The control mode in which the brake pressure is increased will be hereafter referred to as "application mode". The control mode in which the brake pressure is decreased will be hereafter referred to as "release mode". The mode in which the brake pressure is held essentially constant will be hereafter referred to as "hold mode". The anti-skid control operation consists of a loop of the application mode, hold mode, release mode and hold mode. This loop is repeated throughout the anti-skid brake control operation cyclically. One cycle of the loop of the control variation will be hereafter referred to as "skid cycle".

Figure 2:
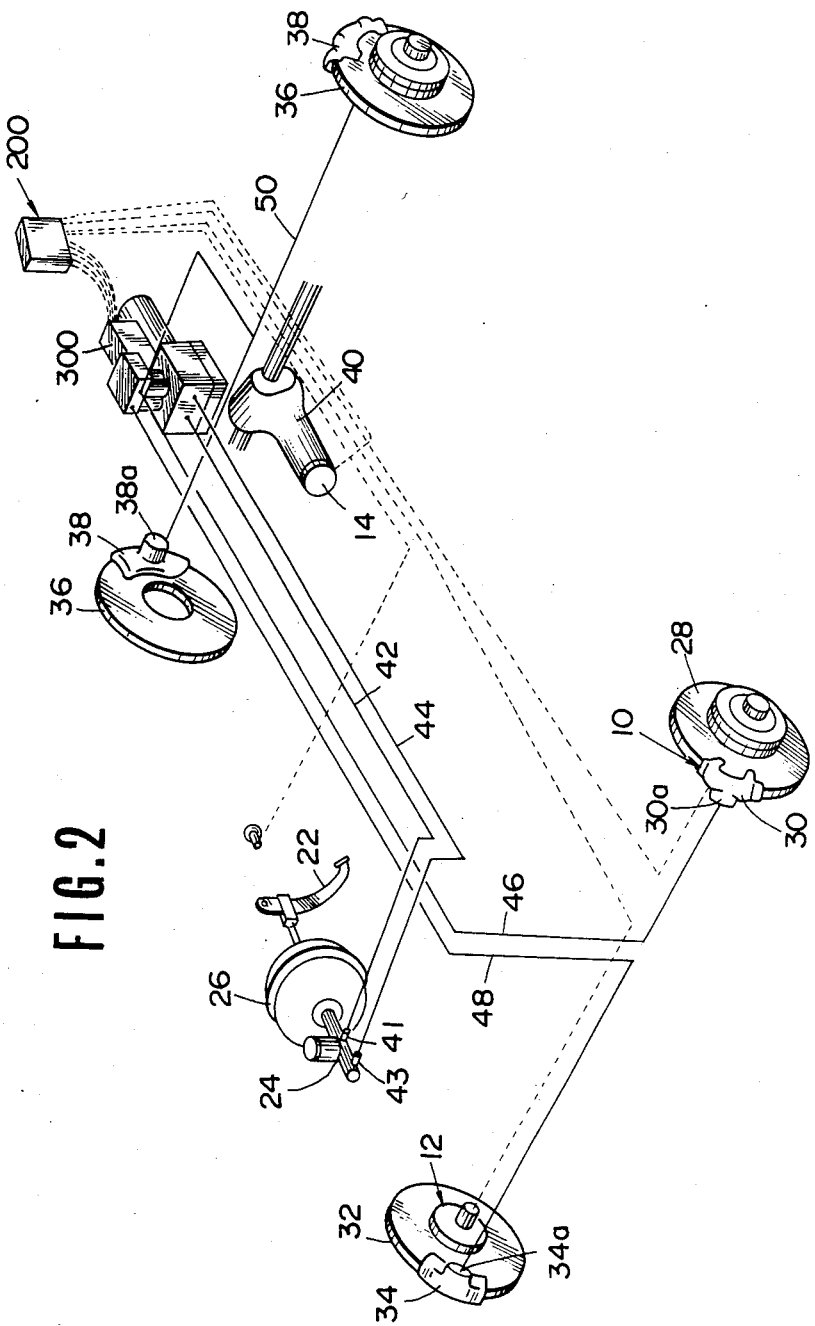
FIG. 2 is a perspective illustration of the hydraulic circuits of the anti-skid brake system according to the present invention.

FIG. 2 shows portions of the hydraulic brake system of an automotive vehicle to which the preferred embodiment of the anti-skid control system is applied. The wheel speed sensors 10 and 12 are respectively provided adjacent the brake disc rotor 28 and 32 for rotation therewith so as to produce sensor signals having frequencies proportional to the wheel rotation speed and variable in accordance with variation of the wheel speed. On the other hand, the wheel speed sensor 14 is provided adjacent a propeller shaft near the differential gear box or drive pinion shaft 116 for rotation therewith. Since the rotation speeds of the left and right rear wheels are free to vary independently depending upon driving conditions due to the effect of the differential gear box 40, the rear wheel speed detected by the rear wheel speed sensor 14 is the average of the speeds of the left and right wheels. Throughout the specification, "rear wheel speed" will mean the average rotation speed of the left and right rear wheels.

As shown in FIG. 2, the actuator unit 300 is connected to a master wheel cylinder 24 via primary and secondary outlet ports 41 and 43 thereof and via pressure lines 44 and 42. The master wheel cylinder 24 is, in turn, associated with a brake pedal 22 via a power booster 26 which is adapted to boost the braking force applied to the brake pedal 22 before applying same to the master cylinder. The actuator unit 300 is also connected to wheel cylinders 30a, 34a and 38a via brake pressure lines 46, 48 and 50.

Figure 3:
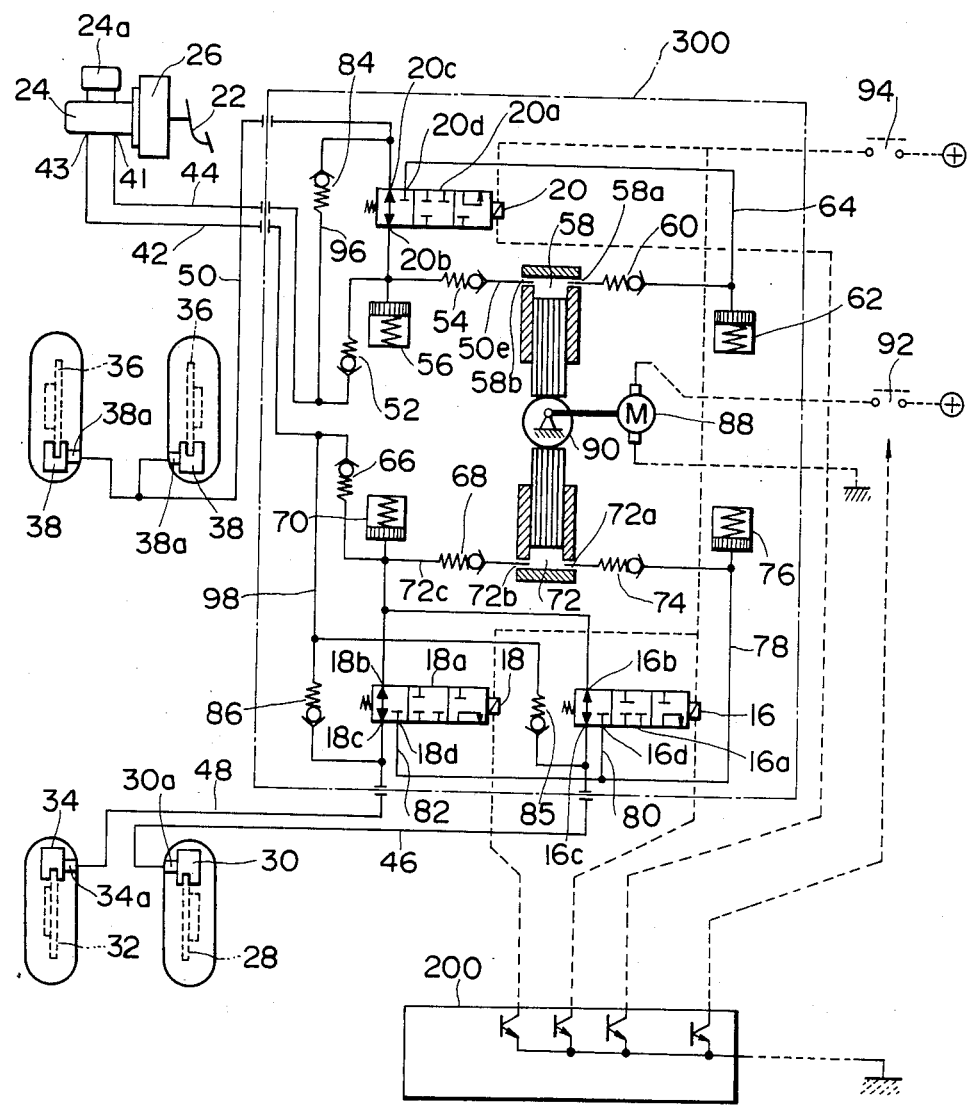
FIG. 3 is a circuit diagram of the hydraulic circuits performing the anti-skid control according to the present invention.

The circuit lay-out of the hydraulic brake system circuit will be described in detail below with reference to FIG. 3 which is only an example of the hydraulic brake system to which the preferred embodiment of the anti-skid control system according to the present invention can be applied, and so it should be appreciated that it is not intended to limit the hydraulic system to the embodiment shown. In FIG. 3, the secondary outlet port 43 is connected to the inlet ports 16b and 18b of electromagnetic flow control valves 16a and 18a, the respective outlet ports 16c and 18c of which are connected to corresponding left and right wheel cylinders 30a and 34a, via the secondary pressure lines 46 and 48. The primary outlet port 41 is connected to the inlet port 20b of the electromagnetic valve 20a, the outlet port 20c of which is connected to the rear wheel cylinders 38a, via a primary pressure line 50. The electromagnetic valves 16a, 18a and 20a also have drain ports 16d, 18d and 20d. The drain ports 16d and 18d are connected to the inlet port 72a of a fluid pump 90 via drain passages 80, 82 and 78. The fluid pump 90 is associated with an electric motor 88 to be driven by the latter which is, in turn, connected to a motor relay 92, the duty cycle of which is controlled by means of a control signal from the control module 200. While the motor relay 92 is energized to be turned ON, the motor 88 is in operation to drive the fluid pump 90. The drawin port 20d of the electromagnetic flow control valve 20a is connected to the inlet port 58a of the fluid pump 90 via a drain passage 64.

The outlet ports 72b and 58b are respectively connected to the pressure lines 42 and 44 via a return passages 72c and 58c. The outlet ports 16c, 18c and 20c of respective electromagnetic flow control valves 16a, 18a and 20a are connected to corresponding wheel cylinders 30a, 34a and 38a via braking lines 46, 48 and 50. Bypass passages 96 and 98 are provided to connect the braking pressure lines 46 and 48, and 50 respectively to the pressure lines 42 and 44, bypassing the electromagnetic flow control valves.

Pump pressure check valves 52 and 66 are installed in the pressure lines 42 and 44. Each of the pump pressure check valves 66 and 52 is adapted to prevent the working fluid pressurized by the fluid pump 90 from transmitting pressure surges to the master cylinder 24. Since the fluid pump 90 is designed for quick release of the braking pressure in the braking pressure lines 46, 48 and 50 and thus releasing the wheel cylinders 30a, 34a and 38a from the braking pressure, it is driven upon release of the brake pedal. This would result in pressure surges in the working fluid from the fluid pump 90 to the master cylinder 24 if the pump pressure check valves 66 and 52 were not provided. The pump pressure check valves 66 and 52 serve as one-way check valves allowing fluid flow from the master cylinder 24 to the inlet ports 16b, 18b and 20b of the electromagnetic valves 16a, 18a and 20a. Pressure accumulators 70 and 56 are installed in the pressure lines 42 and 44, which pressure accumulators serve to accumulate fluid pressure generated at the outlet ports 72b and 58b of the fluid pump 90 while the inlet ports 16b, 18b and 20b are closed. Toward this end, the pressure accumulators 70 and 56 are connected to the outlet ports 72b and 58b of the fluid pump 90 via the return passages 72c and 58c. Outlet valves 68 and 54 are one-way check valves allowing one-way fluid communication from the fluid pump to the pressure accumulators. These outlet valves 68 and 54 are effective for preventing the pressure accumulated in the pressure accumulators 70 and 56 from surging to the fluid pump when the pump is deactivated. In addition, the outlet valves 68 and 54 are also effective to prevent the pressurized fluid flowing through the pressure lines 42 and 44 from flowing into the fluid pump 90 through the return passages 72c and 58c.

Inlet check valves 74 and 60 are inserted in the drain passages 78 and 64 for preventing surge flow of the pressurized fluid in the fluid pump 90 to the electromagnetic flow control valves 16a, 18a and 20a after the braking pressure in the wheel cylinders is released. The fluid flowing through the drain passages 78 and 64 is temporarily retained in fluid reservoirs 76 and 62 connected to the former.

Bypass check valves 85, 86 and 84 are inserted in the bypass passages 98 and 96 for preventing the fluid in the pressure lines 42 and 44 from flowing to the braking pressure lines 46, 48 and 50 without first passing through the electromagnetic flow control valves 16a, 18a and 20a. On the other hand, the bypass check valves 85, 86 and 84 are adapted to permit fluid flow from the braking pressure line 46, 48 and 50 to the pressure lines 42 and 44 when the master cylinder 24 is released and thus the line pressure in the pressure lines 42 and 44 becomes lower than the pressure in the braking pressure lines 46, 48 and 50.

The electromagnetic flow control valves 16a, 18a and 20a are respectively associated with the actuators 16, 18 and 20 to be controlled by means of the control signals from the control module 200. The actuators 16, 18 and 20 are all connected to the control module 200 via an actuator relay 94, which thus controls the energization and deenergization of them all. Operation of the electromagnetic valve 16a in cooperation with the actuator 16 will be illustrated with reference to FIGS. 4, 5 and 6, in particular illustrating the application mode, hold mode and release mode, respectively.

It should be appreciated that the operation of the electromagnetic valves 18a and 20a are substantially the same as that of the valve 16a. Therefore, disclosure of the valve operations of the electromagnetic valves 18a and 20a is omitted in order to avoid unnecessary repetition and for simplification of the disclosure.

APPLICATION MODE

In this position, the actuator 16 remains deenergized. An anchor of the electromagnetic valve 16a thus remains in its initial position allowing fluid flow between the inlet port 16b and the outlet port 16c so that the pressurized fluid supplied from the master cylinder 24 via the pressure line 42 may flow to the left front wheel cylinder 30a via the braking pressure line 46. In this valve position, the drain port 16d is closed to step fluid flow from the pressure line 42 to the drain passage 78. As a result, the line pressure in the braking pressure line 46 is increased in proportion to the magnitude of depression of the brake pedal 22 and thereby the fluid pressure in the left front wheel cylinder 30a is increased correspondingly.

In this case, when the braking force applied to the brake pedal is released, the line pressure in the pressure line 42 drops due to return of the master cylinder 24 to its initial position. As a result, the line pressure in the braking pressure line 46 becomes higher than that in the pressure line 42 and so opens the bypass valve 85 to permit fluid flow through the bypass passage 98 to return the working fluid to the fluid reservoir 24a of the master cylinder 24.

In the preferring construction, the pump pressure check valve 66, normally serving as a one-way check valve for preventing fluid flow from the electromagnetic valve 16a to the master cylinder 24, becomes wide-open in response to drop of the line pressure in the pressure line below a given pressure. This allows the fluid in the braking pressure line 46 to flow backwards through the electromagnetic valve 16a and the pump pressure check valve 66 to the master cylinder 24 via the pressure line 42. This function of the pump pressure check valve 66 facilitates full release of the braking pressure in the wheel cylinder 30a.

For instance, the bypass valve 85 is rated at a given set pressure, e.g. 2 kg/cm$^2$ and closes when the pressure difference between the pressure line 42 and the braking pressure line 46 drops below the set pressure. As a result, fluid pressure approximating the bypass valve set pressure tends to remain in the braking pressure line 46, preventing the wheel cylinder 30a from returning to the fully released position. In order to avoid this, in the shown embodiment, the one-way check valve function of the pump pressure check valve 66 is disabled when the line pressure in the pressure line 42 drops below a predetermined pressure, e.g. 10 kg/cm$^2$. When the line pressure in the pressure line 42 drops below the predetermined pressure, a bias force normally applied to the pump pressure check valve 66 is released, freeing the valve to allow fluid flow from the braking pressure line 46 to the master cylinder 24 via the pressure line 42.

HOLD MODE

In this control mode, a limited first value, e.g. 2A of electric current serving as the control signal is applied to the actuator 16 to position the anchor closer to the actuator 16 than in the previous case. As a result, the inlet port 16b and the drain port 16d are closed to step fluid communication between the pressure line 42 and the braking pressure line 46 and between the braking pressure line and the drain passage 78. Therefore, the fluid pressure in the braking pressure line 46 is held at the level extant at the moment the actuator is operated by the control signal.

In this case, the fluid pressure applied through the master cylinder flows through the pressure check valve 66 to the pressure accumulator 70.

RELEASE MODE

In this control mode, a maximum value, e.g. 5A of electric current serving as the control signal is applied to the actuator 16 to shift the anchor all the way toward the actuator 16. As a result, the drain port 16d is opened to establish fluid communication between the drain port 16d and the outlet port 16c. At this time, the fluid pump 90 serves to facilitate fluid flow from the braking pressure line 46 to the drain passage 78. The fluid flowing through the drain passage is partly accumulated in the fluid reservoir 76 and the remainder flows to the pressure accumulator 70 via the check valves 60 and 54 and the fluid pump 90.

It will be appreciated that, even in this release mode, the fluid pressure in the pressure line 42 remains at a level higher or equal to that in the braking pressure line 46, so that fluid flow from the braking pressure line 46 to the pressure line 42 via the bypass passage 98 and via the bypass check valve 85 will never occur.

In order to resume the braking pressure in the wheel cylinder (FL) 30a after once the braking pressure is reduced by positioning the electromagnetic valve 16a in the release position, the actuator 16 is again deenergized. The electromagnetic valve 16a is thus returns to its initial position to allow the fluid flow between the inlet port 16b and the outlet port 16c so that the pressurized fluid may flow to the left front wheel cylinder 30a via the braking pressure line 46. As set forth the drain port 16a is closed to block fluid flow from the pressure line 42 to the drain passage 78.

As a result, the pressure accumulator 70 is connected to the left front wheel cylinder 30a via the electromagnetic valve 16a and the braking pressure line 46. The pressurized fluid in the pressure accumulator 70 is thus supplied to the wheel cylinder 30a so as to resume the fluid pressure in the wheel cylinder 30a.

At this time, as the pressure accumulator 70 is connected to the fluid reservoir 76 via the check valves 60 and 54 which allow fluid flow from the fluid reservoir to the pressure accumulator, the extra amount of pressurized fluid may be supplied from the fluid reservoir.

The design of the wheel speed sensors 10, 12 and 14 employed in the preferred embodiment of the anti-skid control system will be described in detail with reference to FIGS. 7 to 9.

Figure 7:
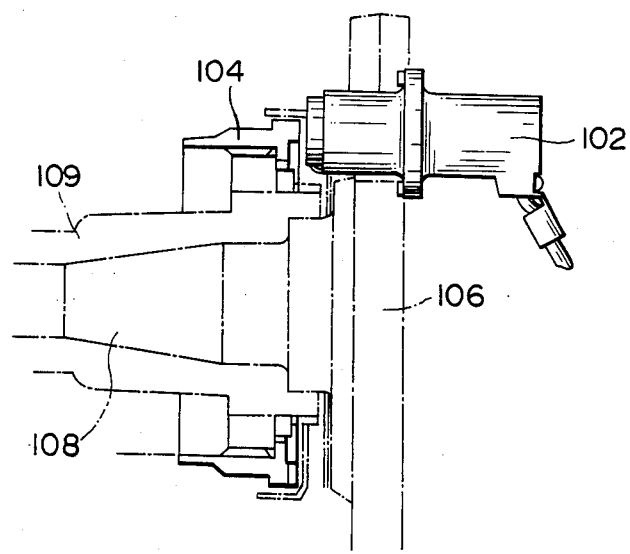
FIG. 7 is a perspective view of a wheel speed sensor adapted to detect the speed of a front wheel.

FIG. 7 shows the structure of the wheel speed sensor 10 for detecting the rate of rotation of the left front wheel. The wheel speed sensor 10 generally comprises a sensor rotor 104 adapted to rotate with the vehicle wheel, and a sensor assembly 102 fixedly secured to the shim portion 106 of the knuckle spindle 108. The sensor rotor 104 is fixedly secured to a wheel hub 109 for rotation with the vehicle wheel.

Figure 9:
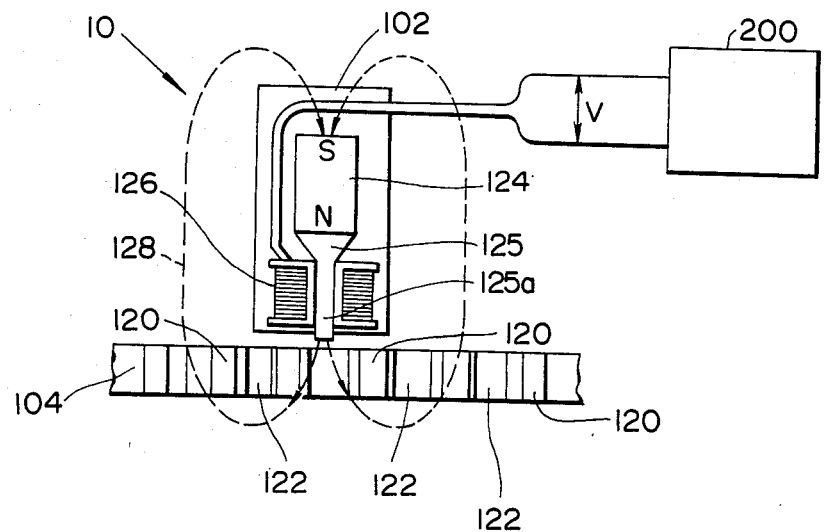
FIG. 9 is an explanatory illustration of the wheel speed sensors of FIGS. 7 and 8.
Figure 10:
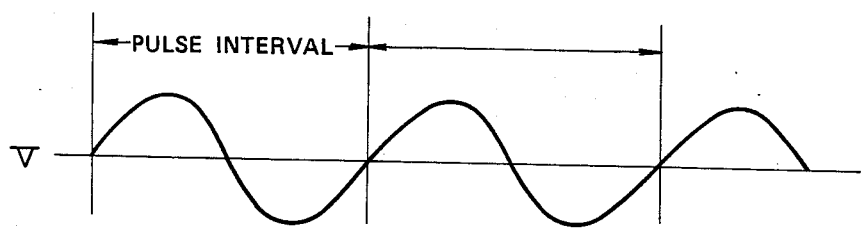
FIG. 10 shows the waveform of an alternating current sensor signal produced by the wheel speed sensor.

As shown in FIG. 9, the sensor rotor 104 is formed with a plurality of sensor teeth 120 at regular angular intervals. The width of the teeth 120 and the grooves 122 therebetween are equal in the shown embodiment and define a unit angle of wheel rotation. The sensor assembly 102 comprises a magnetic core 124 aligned with its north pole (N) near the sensor rotor 104 and its south pole (S) distal from the sensor rotor. A metal element 125 with a smaller diameter section 125a is attached to the end of the magnetic core 124 nearer the sensor rotor. The free end of the metal element 125 faces the sensor teeth 120. An electromagnetic coil 126 encircles the smaller diameter section 125a of the metal element. The electromagnetic coil 126 is adapted to detect variations in the magnetic field generated by the magnetic core 124 to produce an alternating-current sensor signal as shown in FIG. 10. That is, the metal element and the magnetic core 124 form a kind of proximity switch which adjusts the magnitude of the magnetic field depending upon the distance between the free end of the metal element 125 and the sensor rotor surface. Thus, the intensity of the magnetic field fluctuates in relation to the passage of the sensor teeth 120 and accordingly in relation to the angular velocity of the wheel.

It should be appreciated that the wheel speed sensor 12 for the right front wheel has the substantially the same structure as the set forth above. Therefore, explanation of the structure of the right wheel speed sensor 12 will be omitted in order to avoid unnecessary repetition in the disclosure and in order to simplify the description.

Figure 8:
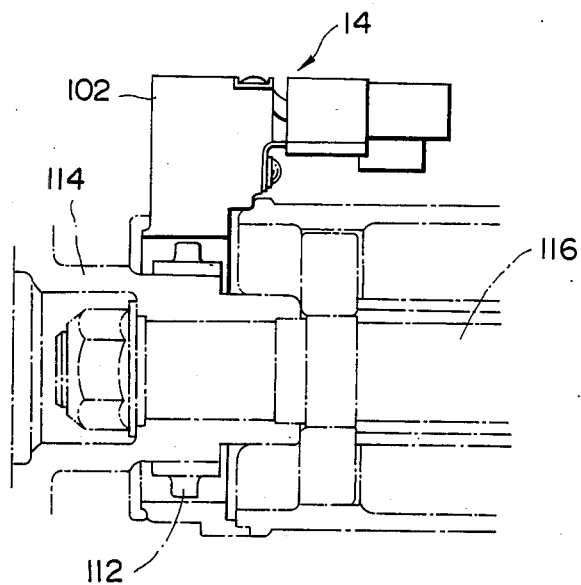
FIG. 8 is a side elevation of a wheel speed sensor adapted to detect the speed of a rear wheel.

FIG. 8 shows the structure of the rear wheel speed sensor 14. As with the aforementioned left front wheel speed sensor 10, the rear wheel speed sensor 14 comprises a sensor rotor 112 and a sensor assembly 102. The sensor rotor 112 is associated with a companion flange 114 which is, in turn, rigidly secured to a drive shaft 116 for rotation therewith. Thus, the sensor rotor 112 rotates with the drive shaft 116. The sensor assembly 102 is fixed to a final drive housing or a differential gear box (not shown).

Each of the sensor assemblies applied to the left and right front wheel speed sensors and the rear wheel sensor is adapted to output an alternating-current sensor signal having a frequency proportional to or corresponding to the rotational speed of the corresponding vehicle wheel. The electromagnetic coil 126 of each of the sensor assemblies 102 is connected to the control module 200 to supply the sensor signals thereof.

As set forth above, the control module 200 comprises the controller unit (FL) 202, the controller unit (FR) 204 and the controller unit (R) 206, each of which comprises a microcomputer. Therefore, the wheel speed sensors 10, 12 and 14 are connected to corresponding controller units 202, 204 and 206 and send their sensor signals thereto. Since the structure and operation of each of the controller units is substantially the same as that of the others, the structure and operation of only the controller unit 202 for performing the anti-skid brake control for the front left wheel cylinder will be explained in detail.

Figure 11:
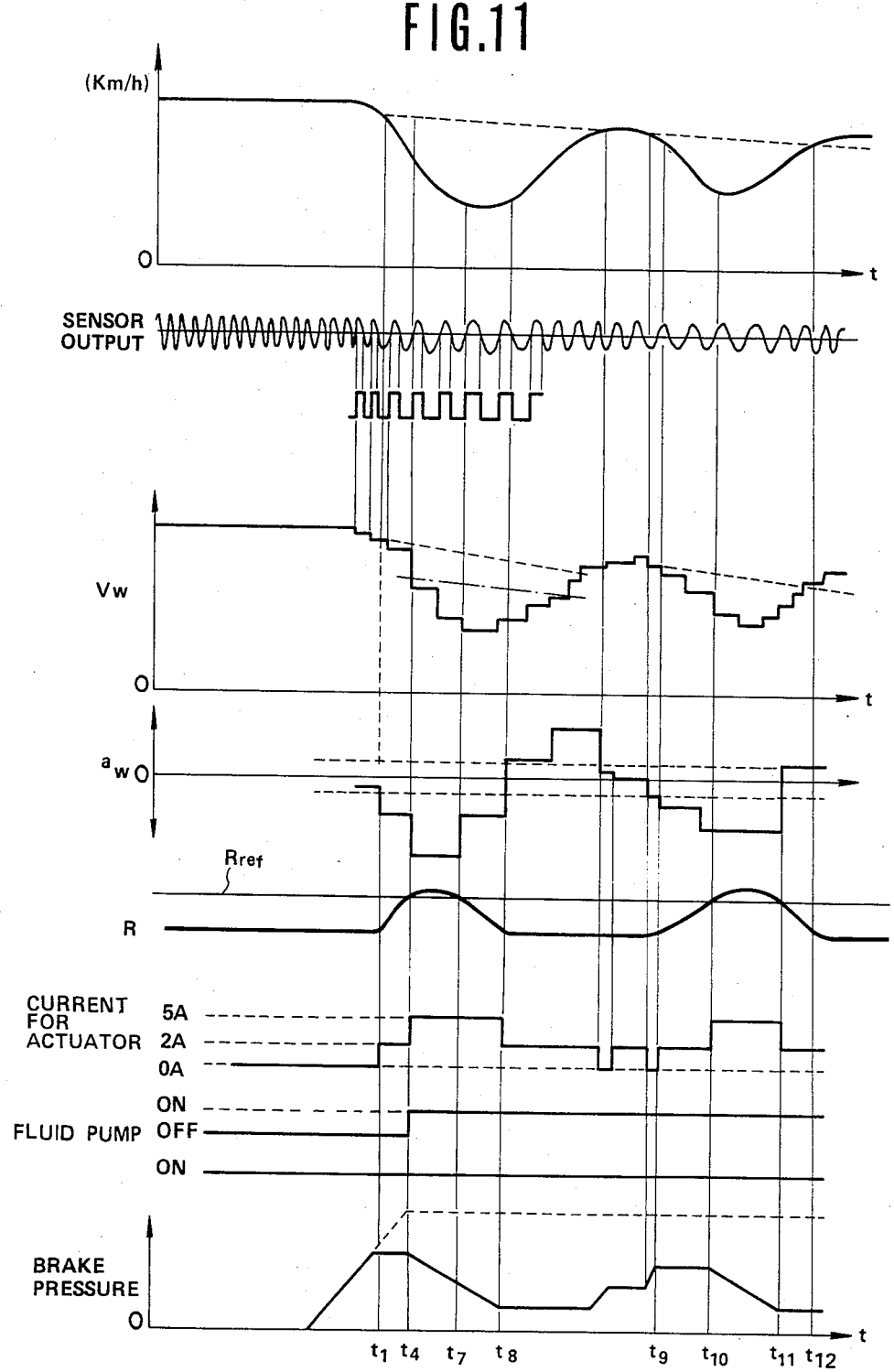
FIG. 11 is a timing chart for the anti-skid control system.

FIG. 11 is a timing chart of the anti-skid control performed by the controller unit 202. As set forth above, the alternating-current sensor signal output from the wheel speed sensor 10 is converted into a rectangular pulse train, i.e. as the sensor pulse signal mentioned above. The controller unit 202 monitors occurrences of sensor pulses and measures the intervals between individual pulses or between the first pulses of groups of relatively-high-frequency pulses. Pulses are so grouped that the measured intervals will exceed a predetermined value, which value will be hereafter referred to as "pulse interval threshold".

The wheel rotation speed $V_w$ is calculated in response to each sensor pulse. As is well known, the wheel speed is generally inversely proportional to the intervals between the sensor pulses, and accordingly, the wheel speed $V_w$ is derived from the interval between the last sensor pulse input time and the current sensor pulse input time. A target wheel speed is designated $V_i$ and the resultant wheel speed is designated $V_w$. In addition, the slip rate is derived from the rate of change of the wheel speed and an projected speed $V_v$ which is estimated from the wheel speed at the moment the brakes are applied based on the assumption of a continuous, linear deceleration without slippage. In general, the target wheel speed $V_i$ is derived from the wheel speed of the last skid cycle during which the wheel deceleration rate was equal to or less than a given value which will be hereafter referred to as "deceleration threshold $a_{ref}$", and the wheel speed of the current skid cycle, and by estimating the rate of change of the wheel speed between wheel speeds at which the rate of deceleration is equal to or less than the deceleration threshold. In practice, the first target wheel speed $V_i$ is derived based on the projected speed $V_v$ which corresponds to a wheel speed at the initial stage of braking operation and at which wheel deceleration exceeds a predetermined value, e.g. $-1.2$ G, and a predetermined deceleration rate, for example 0.4 G. The subsequent target wheel speed $V_i$ is derived based on the projected speeds $V_v$ in last two skid cycles. For instance, the deceleration rate of the target wheel speed $V_i$ is derived from a difference of the projected speeds $V_v$ in the last two skid cycle and a period of time in which wheel speed varies from the first projected speed to the next projected speed. Based on the last projected speed and the deceleration rate, the target wheel speed in the current skid cycle is derived.

The acceleration and deceleration of the wheel is derived based on input times of the three successive sensor pulses. Since the interval of the adjacent sensor signal pulses corresponds to the wheel speed, and the wheel speed is a function of the reciprocal of the interval, by comparing adjacent pulse-to-pulse intervals, a value corresponding to variation or difference of the wheel speed. The resultant may be divided by the period of time in order to obtain the wheel acceleration and deceleration at the unit time. Therefore, the acceleration or deceleration of the wheel is derived from the following equation:

$$a_w = \left( \frac{1}{C-B} - \frac{1}{B-A} \right) / \left( \frac{C-A}{2} \right) \quad (1)$$

where A, B and C are the input time of the sensor pulses in the order given.

On the other hand, the slip rate R is a rate of difference of wheel speed relative to the vehicle speed which is assumed as substantially corresponding to the target wheel speed. Therefore, in the shown embodiment, the target wheel speed $V_i$ is taken as variable or parameter indicative of the assumed or projected vehicle speed. The slip rate R can be obtained by dividing a difference between the target wheel speed $V_i$ and the instantaneous wheel speed $V_w$ by the target wheel speed. Therefore, in addition, the slip rate R is derived by solving the following equation:

$$R = \frac{V_i - V_w}{V_i} \quad (2)$$

Finally, the controller unit 202 determines the control mode, i.e., release mode, hold mode and application mode from the slip rate R and the wheel acceleration or deceleration $a_w$.

General operation of the controller unit 202 will be briefly explained herebelow with reference to FIG. 11. Assuming the brake is applied at $t_0$ and the wheel deceleration $a_w$ exceeds the predetermined value, e.g. 1.2 G at a time $t_1$, the controller under 202 starts to operate at a time $t_1$. The first sensor pulse input time ($t_1$) is held in the controller unit 202. Upon receipt of the subsequent sensor pulse at a time $t_2$, the wheel speed $V_w$ is calculated by deriving the current sensor pulse period ($dt = t_2 - t_1$). In response to the subsequently received sensor pulses at times $t_3$, $t_4$..., the wheel speed values $V_{w2}$, $V_{w3}$... are calculated.

On the other hand, at the time $t_1$, the instantaneous wheel speed is taken as the projected speed $V_v$. Based on the projected speed $V_v$ and the predetermined fixed value, e.g. 0.4 G, the target wheel speed $V_i$ decelerating at the predetermined deceleration rate 0.4 G is derived.

In anti-skid brake control, the braking force applied to the wheel cylinder is to be so adjusted that the peripheral speed of the wheel, i.e. the wheel speed, during braking is held to a given ratio, e.g. 85% to 80% of the vehicle speed. Therefore, the slip rate R has to be maintained below a given ratio, i.e., 15% to 10%. In the preferred embodiment, the control system controls the braking force so as to maintain the slip rate at about 15%. Therefore, a reference value $R_{ref}$ to be compared with the slip rate R is determined at a value at 85% of the projected speed $V_v$. As will be appreciated, the reference value is thus indicative of a slip rate threshold, which will be hereafter referred to "slip rate threshold $R_{ref}$" through the specification and claims, and varies according to variation of the target wheel speed.

Figure 4:
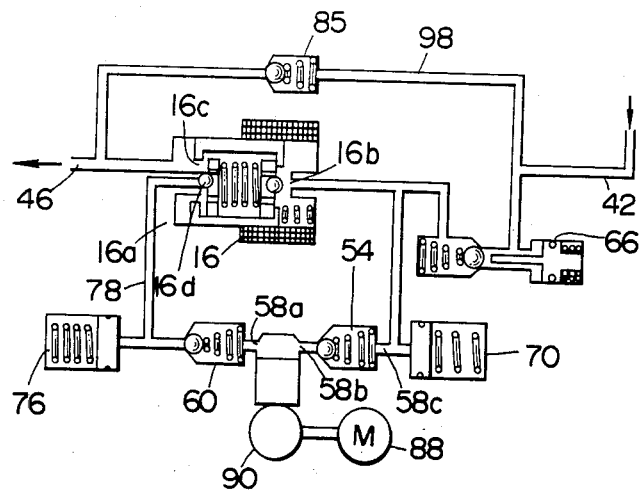
FIG. 4 is an illustration of the operation of an electromagnetic flow control valve employed in the hydraulic circuit, which valve has been shown in an application mode for increasing the fluid pressure in a wheel cylinder.
Figure 5:
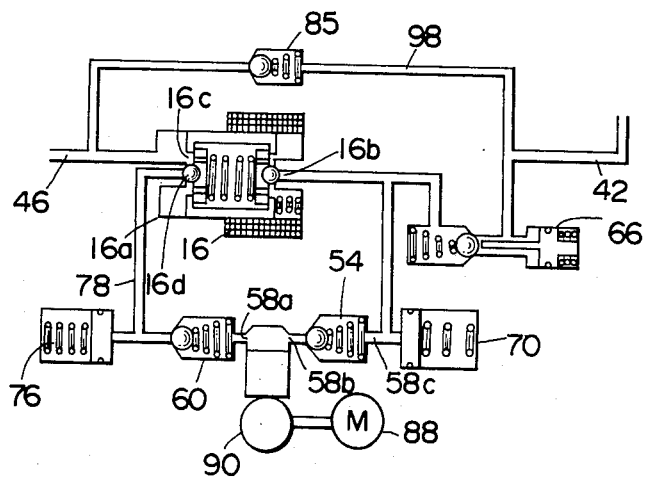
FIG. 5 is a view similar to FIG. 4 but of the valve in a hold mode in which the fluid pressure in the wheel cylinder is held at a substantially constant value.
Figure 6:
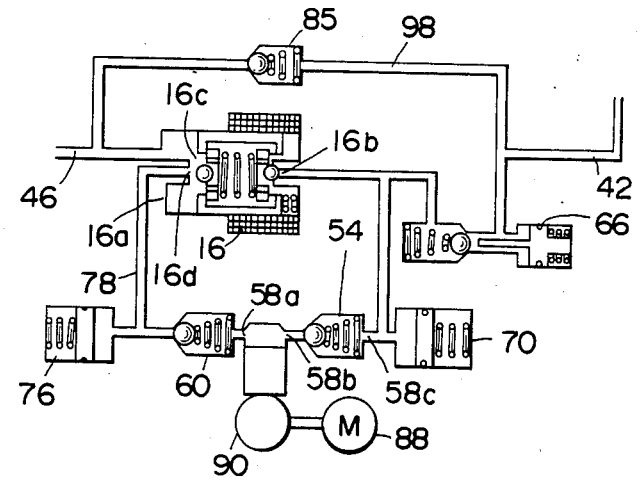
FIG. 6 is a view similar to FIG. 4 but of the valve in a release mode in which the fluid pressure in the wheel cylinder is reduced.

In practical brake control operation performed by the preferred embodiment of the anti-skid control system according to the present invention, the electric current applied to the actuator attains a limited value, e.g., 2A to place the electromagnetic valve 30a in the hold mode as shown in FIG. 5 when the wheel speed remains inbetween the target wheel speed $V_i$ and the slip rate threshold $R_{ref}$. When the slip rate derived from the target wheel speed $V_i$ and the wheel speed $V_w$ becomes equal to or larger than the slip rate threshold $R_{ref}$, then the supply current to the actuator 16 is increased to a maximum value, e.g. 5A to place the electromagnetic valve in the release mode as shown in FIG. 6. By maintaining the release mode, the wheel speed $V_w$ is recovered to the target wheel speed. When the wheel speed is thus recovered or resumed so that the slip rate R at that wheel speed becomes equal to or less than the slip rate threshold $R_{ref}$, then the supply current to the actuator 16 is dropped to the limited value, e.g. 2A to return the electromagnetic valve 30a to the hold mode. By holding the reduced fluid pressure in the wheel cylinder, the wheel speed $V_w$ is further resumed to the target wheel speed $V_i$. When the wheel speed $V_w$ is resumed equal to or higher than the target wheel speed $V_i$, the supply current is further dropped to zero for placing the electromagnetic valve in the application mode as shown in FIG. 4. The electromagnetic valve 30a is maintained in the application mode until the wheel speed is decelerated at a wheel speed at which the wheel deceleration becomes equal to or slightly more than the deceleration threshold $R_{ref}$ — 1.2 G. At the same time, the projected speed $V_v$ is again derived with respect to the wheel speed at which the wheel deceleration $a_w$ becomes equal to or slightly larger than the deceleration threshold $a_{ref}$. From a difference of speed of the last projected speed and the instant projected speed and the period of time from a time obtaining the last projected speed to a time obtaining the instant projected speed, a deceleration rate of the target wheel speed $V_i$ is derived. Therefore, assuming the last projected speed is $V_{v1}$, the instant projected speed is $V_{v2}$, and the period of time is $T_v$, the target wheel speed $V_i$ can be obtained from the following equation:

$$V_i = V_{v2} - (V_{v1} - V_{v2})/T_v \times t_e$$

where $t_e$ is an elapsed time from the time at which the instant projected speed $V_{v2}$ is obtained.

Based on the input timing $t_1$, $t_2$, $t_3$, $t_4$..., deceleration rate $a_w$ is derived from the foregoing equation (1). In addition, the projected speed $V_v$ is estimated as a function of the wheel speed $V_w$ and rate of change thereof. Based on the instantaneous wheel speeds $V_{w1}$ at which the wheel deceleration is equal to or less than the deceleration threshold $a_{ref}$ and the predetermined fixed value, e.g. 0.4 G for the first skid cycle of control operation, the target wheel speed $V_i$ is calculated. According to equation (2), the slip rate R is calculated, using successive wheel speed values $V_{w1}$, $V_{w2}$, $V_{w3}$... as parameters. The derived slip rate R is compared with the slip rate threshold $R_{ref}$. As the wheel speed $V_w$ drops below the projected speed $V_v$ at the time $t_1$, the controller unit 202 switches the control mode from the application mode to the hold mode. Assuming also that the slip rate R exceeds the slip rate threshold at the time $t_4$, then the contoller unit 202 switches the control mode to the release mode to release the fluid pressure at the wheel cylinder.

Upon release of the brake pressure in the wheel cylinder, the wheel speed $V_w$ recovers, i.e. the slip rate R drops until it is smaller than the slip rate threshold at time $t_7$. The controller unit 202 detects when the slip rate R is smaller than the slip rate threshold $R_{ref}$ and switches the control mode from release mode to the hold mode.

By maintaining the brake system in the hold mode in which reduced brake pressure is applied to the wheel cylinder, the wheel speed increases until it reaches the projected speed as indicated by the intersection of the dashed line ($V_v$) and the solid trace in the graph of $V_w$ in FIG. 11. When the wheel speed $V_w$ becomes equal to the target wheel speed $V_i$ (at a time $t_8$), the controller unit 202 switches the control mode from the hold mode to the application mode.

As can be appreciated from the foregoing description, the control mode will tend to cycle through the control modes in the order application mode, hold mode, release mode and hold mode, as exemplified in the period of time from $t_1$ to $t_8$. This cycle of variation of the control modes will be referred to hereafter as "skid cycle". Practically speaking, there will of course be some hunting and other minor deviations from the standard skid cycle.

The projected speed $V_v$, which is meant to represent ideal vehicle speed behavior, at time $t_1$ can be obtained directly from the wheel speed $V_w$ at that time since zero slip is assumed. At the same time, the deceleration rate of the vehicle will be assumed to be a predetermined fixed value or the appropriate one of a family thereof, in order to enable calculation of the target wheel speed for the first skid cycle operation. Specifically, in the shown example, the projected speed $V_v$ at the time $t_1$ will be derived from the wheel speed $V_{w1}$ at that time. Using the predetermined deceleration rate, the projected speed will be calculated at each time the wheel deceleration $a_w$ in the application mode reaches the deceleration threshold $a_{ref}$.

At time $t_9$, the wheel deceleration $a_w$ becomes equal to or slightly larger than the deceleration threshold $a_{ref}$, then the second projected speed $V_{v2}$ is obtained at a value equal to the instantaneous wheel speed $V_w$ at the time $t_9$. According to the abovementioned equation, the deceleration rate da can be obtained $$da = (V_{v1} - V_{v2})/(t_9 - t_1)$$

Based on the derived deceleration rate da, the target wheel speed $V_i'$ for the second skid cycle of control operation is derived by:

$$V_i' = V_{v2} - da \times t_e$$

Based on the derived target wheel speed, the slip rate threshold $R_{ref}$ for the second cycle of control operation is also derived. As will be appreciated from FIG. 11, the control mode will be varied during the second cycle of skid control operation, to the hold mode at time $t_9$ at which the wheel deceleration reaches the deceleration threshold $a_{ref}$ as set forth above, to the release mode at time $t_{10}$ at which the slip rate R reaches the slip rate threshold $R_{ref}$, to the hold mode at time $t_{11}$ at which the slip rate R is recovered to the slip rate threshold $R_{ref}$, and to the application mode at time $t_{12}$ at which the wheel speed $V_w$ recovered or resumed to the target wheel speed $V_i'$. Further, it should be appreciated that in the subsequent cycles of the skid control operations, the control of the operational mode of the electromagnetic valve as set forth with respect to the second cycle of control operation, will be repeated.

Relating the above control operations to the structure of FIGS. 3 through 6, when application mode is used, no electrical current is applied to the actuator of the electromagnetic valve 16a so that the inlet port 16b communicates with the outlet port 16c, allowing fluid flow between the pressure passage 42 and the brake pressure line 46. A limited amount of electrical current (e.g. 2A) is applied at times $t_1$, $t_7$, $t_9$ and $t_{11}$, so as to actuate the electromagnetic valve 16a to its limited stroke position by means of the actuator 16, and the maximum current is applied to the actuator as long as the wheel speed $V_w$ is not less than the projected speed and the slip rate is greater than the slip rate threshold $R_{ref}$. Therefore, in the shown example, the control mode is switched from the application mode to the hold mode at time $t_1$ and then to the release mode at time $t_4$. At time $t_7$, the slip rate increases back up to the slip rate threshold $R_{ref}$, so that the control mode returns to the hold mode, the actuator driving the electromagnetic valve 16a to its central holding position with the limited amount of electrical current as the control signal. When the wheel speed $V_w$ finally returns to the level of the target wheel speed $V_i$ at time $t_8$, the actuator 16 supply current is cut off so that the electromagnetic valve 16a returns to its rest position in order to establish fluid communication between the pressure line 42 and the braking pressure line 46 via inlet and outlet ports 16b and 16c.

Figure 13:
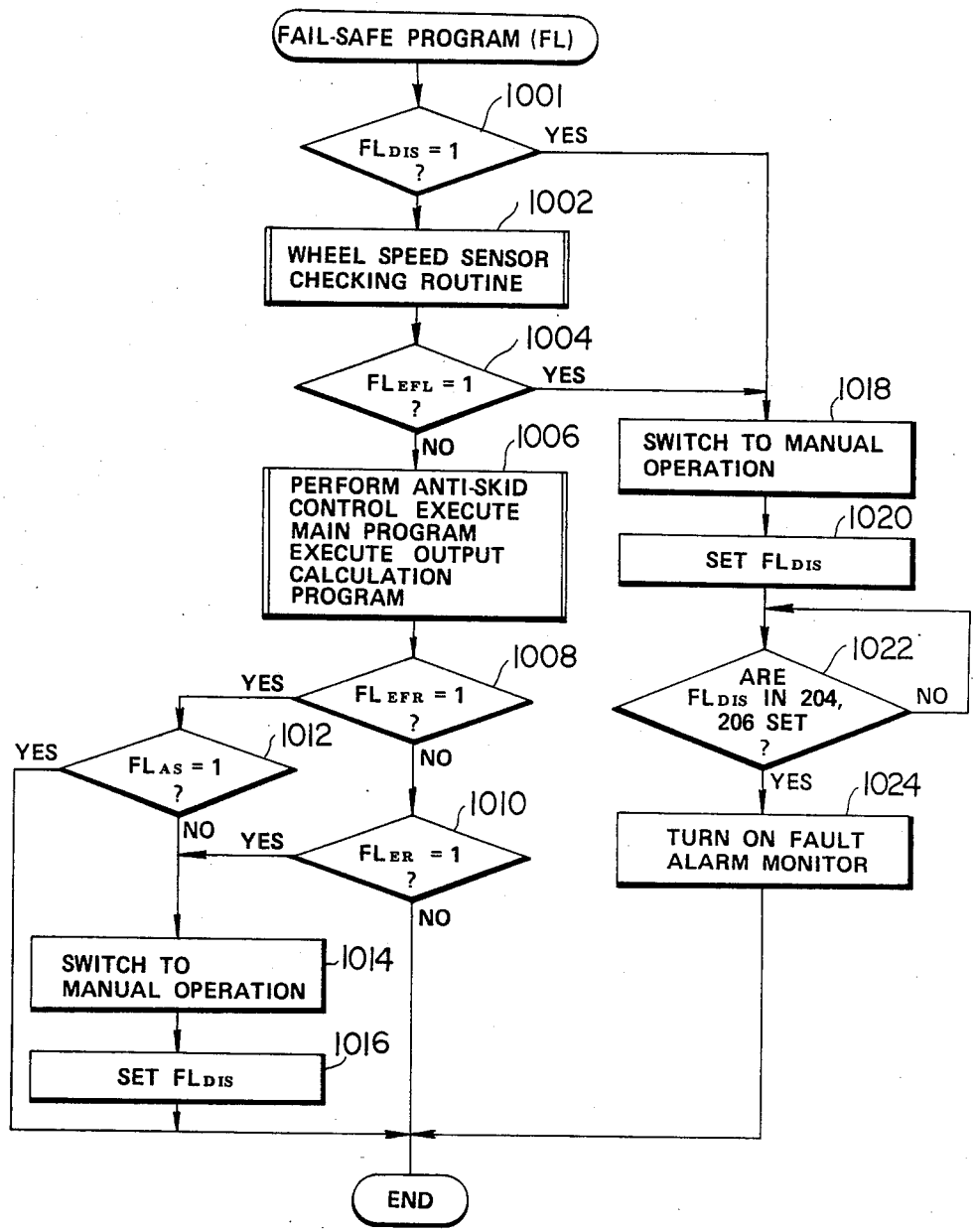
FIG. 13 is a flowchart of a fail-safe program to be executed by the front-wheel controller units of FIG. 12 as a background job.
Figure 14:
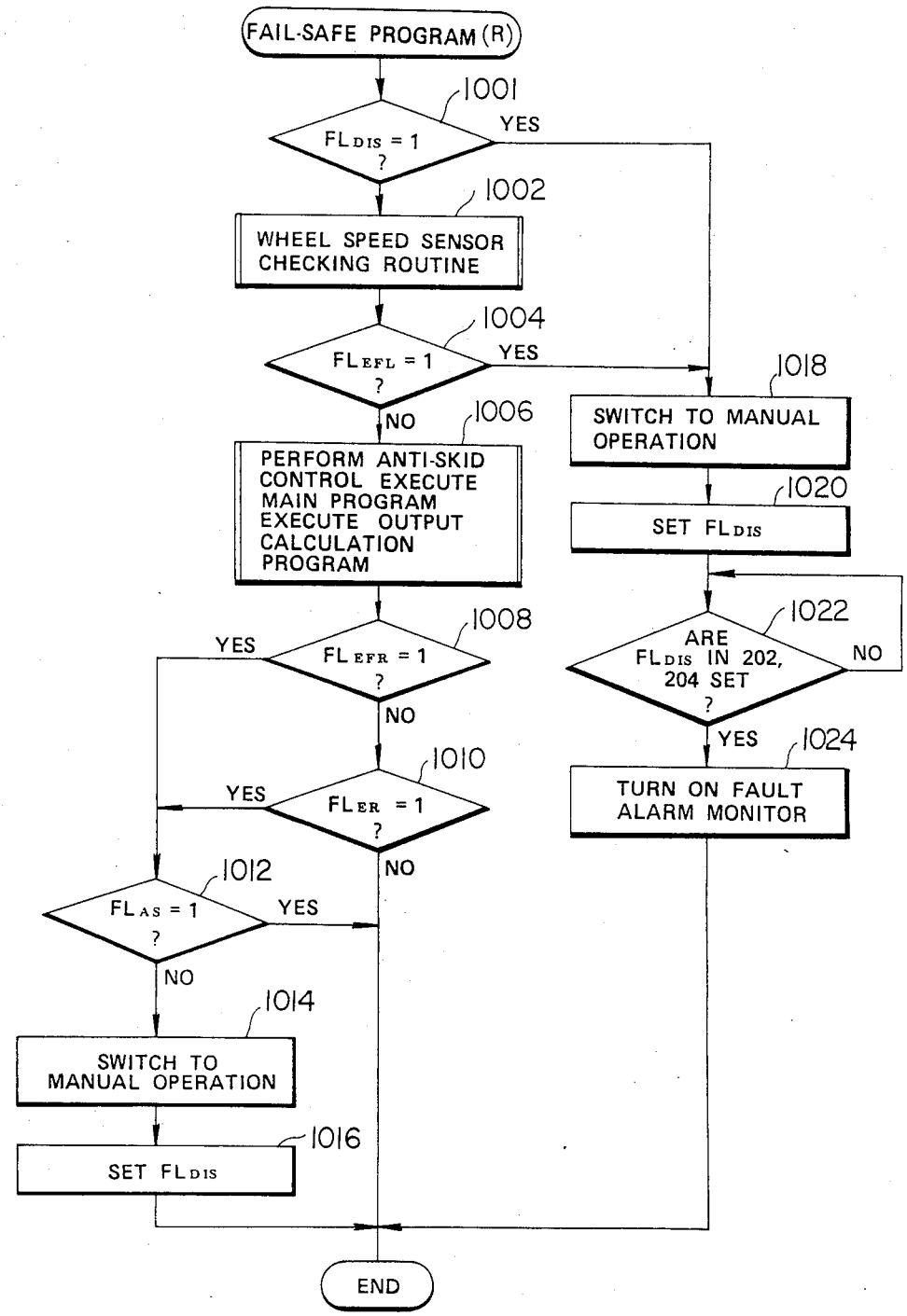
FIG. 14 is a flowchart of the fail-safe program executed by the rear-wheel controller unit.
Figure 15:
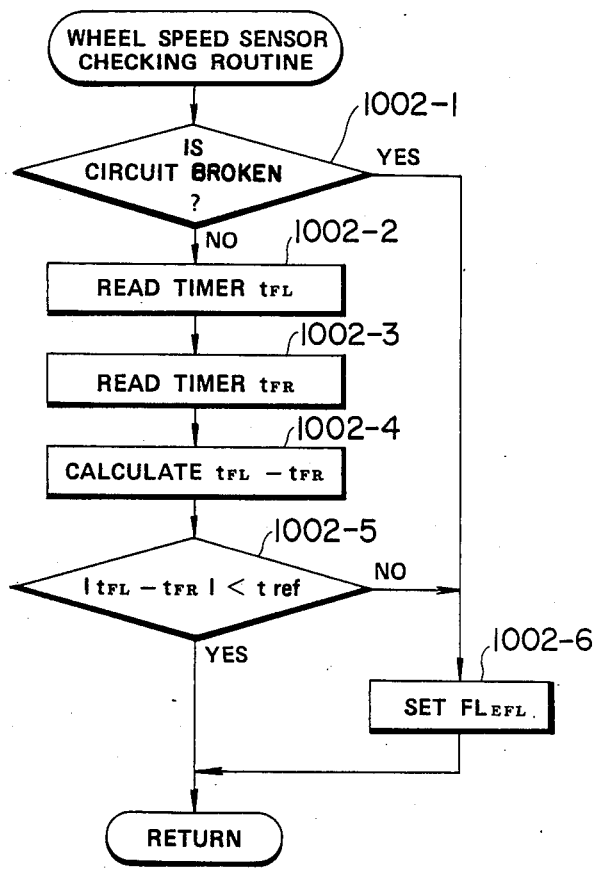
FIG. 15 is a flowchart of a wheel speed sensor checking routine in the fail-safe program of FIGS. 13 and 14.
Figure 16:
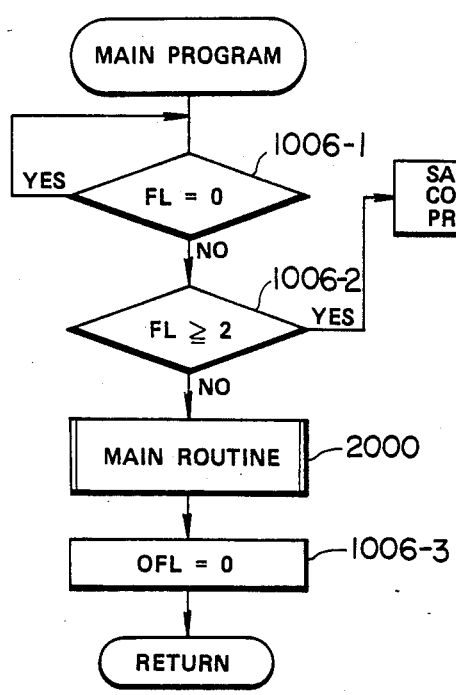
FIG. 16 is a flowchart of a main program of the controller unit of FIG. 12 for performing anti-skid control.
Figure 17:
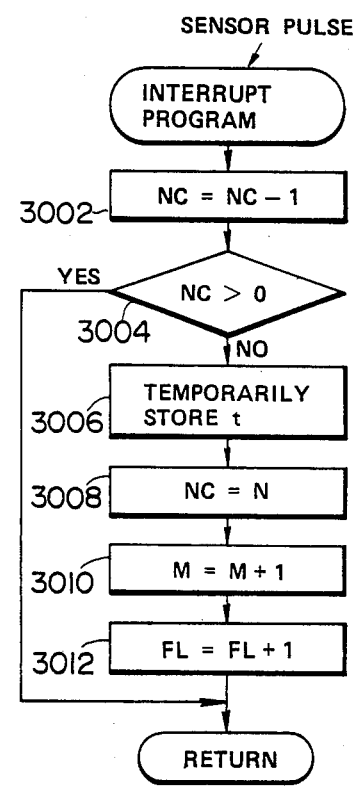
FIG. 17 is a flowchart of an interrupt program executed by the controller unit.
Figure 18:
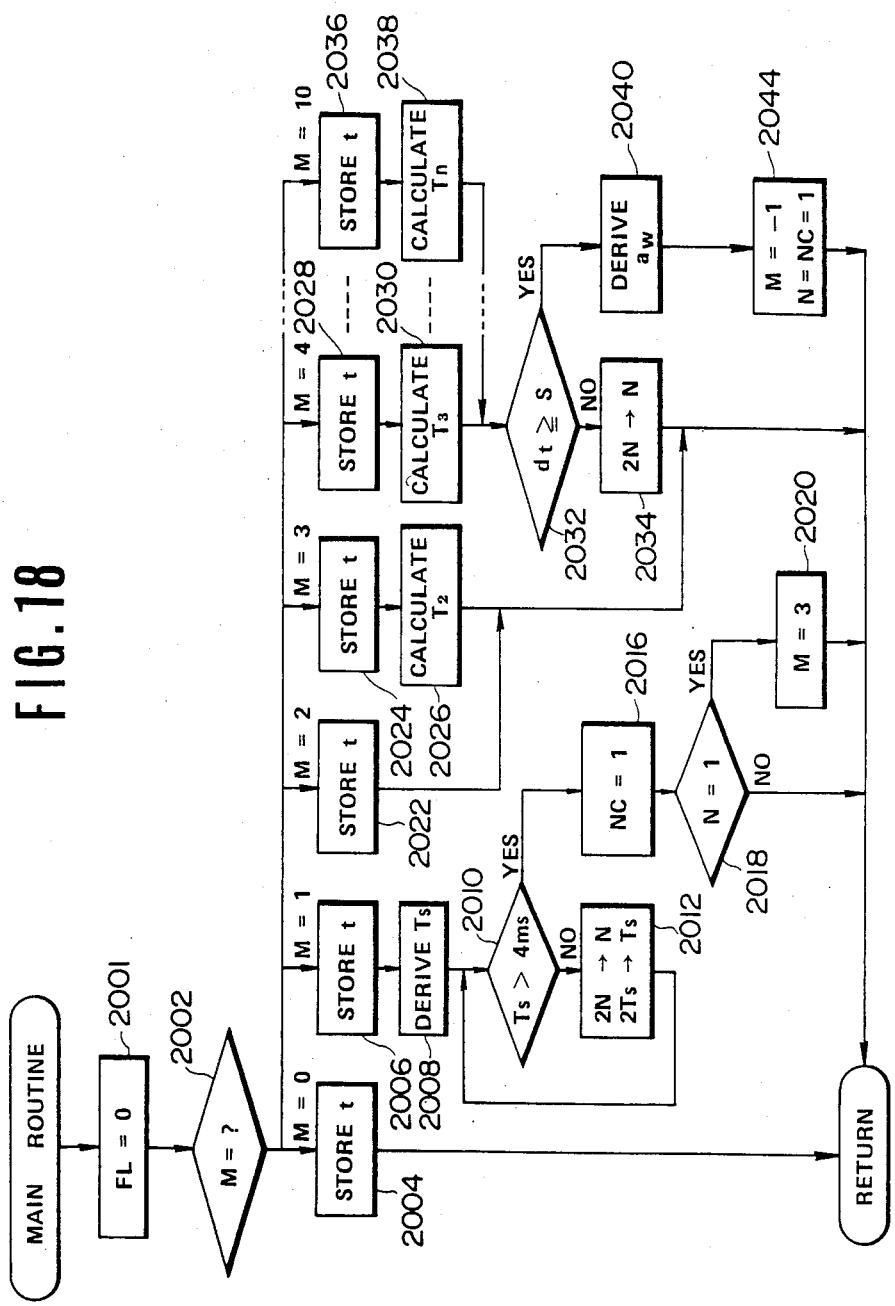
FIG. 18 a flowchart of a main routine in the main program of FIGS. 16 and 17.
Figure 19:
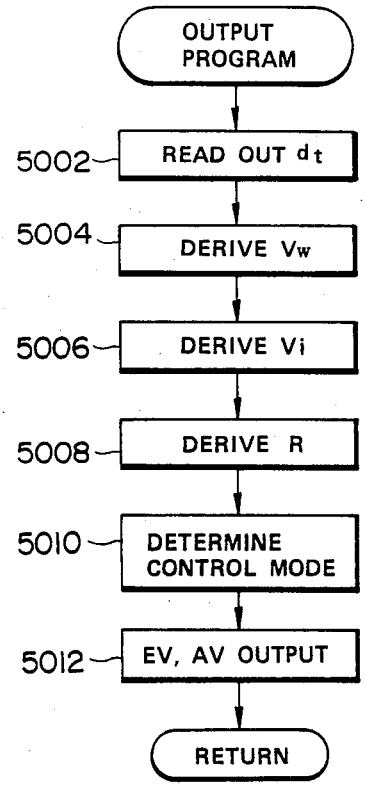
FIG. 19 is a flowchart of an output calculation program for deriving EV and AV signals for controlling the operation mode of the electromagnetic pressure control valve according to the valve conditions of FIGS. 4, 5 and 6.

FIGS. 13 and 14 are flowchart of fail-safe programs which are to be executed repeatedly as a background job by the front controller units 202 and 204 and by the rear controller unit 206, respectively. It should be appreciated that each of the controller units 202, 204 and 206 execute the corresponding fail-safe program in parallel to the others and mutually independent of the others. The shown fail-safe programs are intended to detect malfunction of the wheel speed sensor and to perform back-up operations by switching braking operation from the anti-skid control mode to the manual mode. The fail-safe programs thus include a routine for checking the input from the wheel speed sensor, which wheel speed sensor checking routine is illustrated in FIG. 15. The fail-safe program also includes a routine for performing anti-skid control. The anti-skid control routine includes a main program for sampling the input timing of sensor signal pulses from the wheel speed sensor and for deriving wheel acceleration based on the sampled input timing data, which main program is shown in FIGS. 16, 17 and 18. Furthermore, an output calculation program as shown in FIG. 19 is to be executed periodically by interrupting the fail-safe programs of FIGS. 13 and 14.

Figure 12:
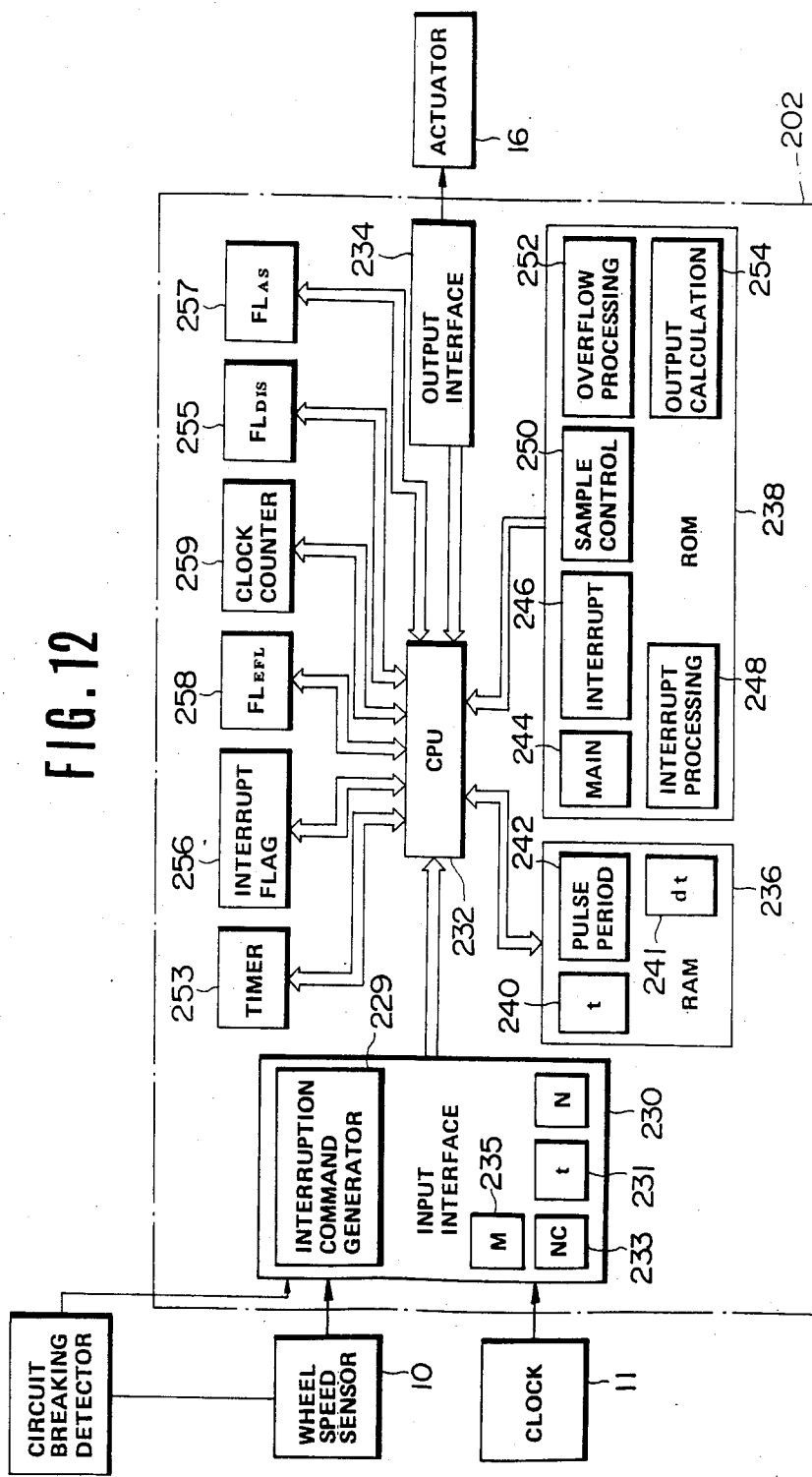
FIG. 12 is a step diagram of the preferred embodiment of a controller unit in the anti-skid brake control system according to the present invention.

In order to perform control operations according to the fail-safe program, which includes the main program and the output calculation program as subroutines, each of the controller units 202, 204 and 206 is composed of the components illustrated in FIG. 12. Since the circuitry and components used in the units 204 and 206 are substantially the same as that in the controller unit 202, the following explanation will be made only for the controller 202 in order to avoid confusion in disclosure and to simplify the explanation. However, it should be appreciated that the circuitry of the system and the functions performed by the controller unit 202 is the same for the controller unit 204 and thus the following explanation applies not only to the controller unit 202 but also to the controller unit 204. Differences between the functions of the controller units 202 and 206 will be explained in detail.

Referring to FIG. 12, the controller unit 202 includes an input interface 230, CPU 232, an output interface 234, RAM 236 and ROM 238. The input interface 230 is connected to the wheel speed sensor 16 via a shaping circuit or analog-to-digital converter 208 for converting the alternating-current sensor signal into digital sensor signal pulses so that the signal is compatible with the digital processor forming the major portion of the controller unit 202. The input interface 230 includes an interrupt command generator 229 which produces an interrupt command in response to each sensor pulse to induce the microprocessor to execute the interrupt program of FIG. 17 which samples the input timing of the sensor signal pulses. The input interface also has a temporary register for temporarily holding the input timing data of the sensor signal pulses. RAM 236 similarly has a memory step 240 holding input timing data for the sensor signal pulses. The contents of the memory step 240 of RAM may be shifted whenever calculations of the pulse interval, wheel speed, wheel acceleration and deceleration, target wheel speed, slip rate and so forth are completed. One method for shifting the contents of the memory step 240 is disclosed in U.S. Pat. No.

4,408,290. The disclosure of the U.S. Pat. No. 4,408,290 is hereby incorporated by reference. RAM also has a memory step 242 for holding pulse intervals of the input sensor pulses. The memory step 242 is also adapted to shift the contents thereof according to the manner similar to set forth in the U.S. Pat. No. 4,408,290.

An interrupt flag 256 is provided in the controller unit 202 for signalling interrupt requests to the CPU. The interrupt flag 256 is set in response to the interrupt command from the interrupt command generator 229. A timer overflow interrupt flag 258 is adapted to set an overflow flag when the measured interval between any pair of monitored sensor pulses exceeds the a capacity of a clock counter.

In order to time the arrival of the sensor pulses, a clock is connected to the controller unit 202 to feed time signals indicative of elapsed real time. The timer signal value is latched whenever a sensor pulse is received and stored in either or both of the temporary register 231 in the input interface 230 and the memory step 240 of RAM 236.

The controller unit 202 is also provided with a flag register 257 which is to be set while the anti-skid brake control is being performed. Another flag register 258 in the controller unit 202 is set when failure of a wheel speed sensor is detected. Throughout the disclosure, the flag register 257 will be referred to as an "operation flag ($FL_{AS}$) register", and the flag register 258 will be referred to as an "error flag ($FL_{EFL}$) register". The error flags in the controller units 204 and 206 will be referred to as an "error flag ($FL_{EFR}$ or $FL_{ER}$)" in the following description. The controller unit 202 also has a flag $FL_{DIS}$ register 255 which is to be set when anti-skid control is disabled due to failure of one of the wheel speed sensors, and thus the braking operation is switched from the controlled anti-skid mode to manual mode. A clock counter 259 is also provided for counting clock pulses from the clock generator 11. The controller unit 202 also has a timer 253 which is adapted to count the clock pulses from the clock generator 11 and is reset in response to each successive sensor signal pulse. Therefore, the timer 253 is adapted to measure the pulse interval.

It should be appreciated that operation of the anti-skid brake control system is determined by predetermined operation parameters such as wheel deceleration rate. In practice, the operating state of the controller unit will be recognized upon expiration of a given period of time, e.g. 2 sec, after termination of the RELEASE MODE operation. In order to detect termination of the RELEASE MODE, the HIGH level of an inlet signal EV which will be described later, will be monitored. In addition, a circuit breaking detector 10a is connected to the magnetic coil 126 of the wheel speed sensor 10. The circuit breaking detector 10a supplies a weak detector current to the coil 126. As the voltage at the coil 126 will go HIGH when the circuit is broken, the detector 10a outputs a detector signal when the voltage at the coil is higher than a given voltage.

In operation, the fail-safe program of FIG. 13 is executed repeatedly. Immediately after starting execution of the fail-safe program, the disable flag $FL_{DIS}$ of the corresponding controller unit is checked in step 1001. Under normal conditions, the disable flag will be reset ($FL_{DIS}=0$), and control then passes to step 1002, in which the wheel speed sensor checking routine of FIG. 15 is executed. In the wheel speed sensor checking routine of FIG. 15, first, input from the detector 10a is checked to detect breakage of the circuit at a step 1002-1. If the detector signal from the detector 10a is absent, the value $t_{FL}$ of the timer 253 in the controller unit 202 is read out at a step 1002-2. Then, a value $t_{FR}$ of the corresponding timer in the controller unit 204 is read at a step 1002-3. The absolute value $|t_{FL}-t_{FR}|$ of the difference between the timer values $t_{FL}$ and $t_{FR}$ is derived at a step 1002-4. Thereafter, the derived difference $|t_{FL}-t_{FR}|$ is compared with a reference value $t_{ref}$ at a step 1002-5. By comparing the difference with the reference value, shorting of the circuit can be detected. When the circuit is broken when checked at the step 1002-1 or when the absolute value $|t_{FL}-t_{FR}|$ is greater than the reference value $t_{ref}$, the error flag $FL_{EFL}$ is set at a step 1002-6. When the absolute value of the derived difference is smaller than the reference value $t_{ref}$, or after the step 1002-6, control returns to the fail-safe program at a step 1004.

At the step 1004, the error flag ($FL_{EFL}$) is checked. If the error flag $FL_{EFL}$ is not set, anti-skid brake control is performed at a step 1006. During execution of this step 1006, the main program of FIG. 16 and the main routine of FIG. 18 are executed.

After one cycle of anti-skid brake control operation at the step 1006, the error flag $FL_{EFR}$ in the controller unit 204 for anti-skid controlling the front-right wheel is checked at a step 1008. If not set, the error flag $FL_{ER}$ of the rear wheel controller unit 206 is checked at a step 1010. If both of the error flags $FL_{EFR}$ and $FL_{ER}$ are not set, execution of the fail-safe program ends.

If the error flag $FL_{EFR}$ is set when checked at the step 1008, then the operation flag $FL_{AS}$ in the flag register 257 is checked at a step 1012. If the flag $FL_{AS}$ is set, then the program ends. On the other hand, if the operation flag $FL_{AS}$ is not set, the operation mode is switched to manual operation, so that anti-skid brake control is disabled and braking pressure is adjusted solely by manual operation, at a step 1014. Thereafter, at a step 1016, the disable flag $FL_{DIS}$ in the flag register 255 is set. After the step 1016, the program ends.

On the other hand, if the error flag $FL_{ER}$ is set when checked at the step 1010, control again passes to the step 1014 to switch operation into the manual mode.

If the disable flag $FL_{SID}$ is set at step 1001 or the error flag $FL_{EFL}$ is set at the step 1004, the operational mode is switched to the manual mode at a step 1018 and the disable flag $FL_{DIS}$ of controller 202 is set at step 1020. Then, the disable flags $FL_{DIS}$ in the corresponding flag registers in the controller units 204 and 206 are checked at a step 1022. After both of the disable flags $FL_{DIS}$ are set, then a fault alarm monitor 17 is turned ON to indicate that the anti-skid control is disabled at a step 1024. Thereafter, execution of the fail-safe program ends.

It should be noted that the controller unit 204 will execute a fail-safe program analogous, but not identical, to the one described above.

FIG. 14 is a flowchart of the rear-wheel fail-safe program analogous to FIG. 13. Besides the necessary rearrangement of flag labels, the only difference between FIGS. 13 and 14 lies in the arrangement of steps 1010 and 1012. Specifically, in FIG. 14, if either of the flags $FL_{EFR}$ or $FL_{EFL}$ is set when checked at steps 1008 and 1010 respectively, control passes to step 1012. This means that as long as the rear wheel speed sensor 14 continues to function normally, the rear controller unit 206 will continue to operate throughout the current anti-skid control episode.

By comparing FIGS. 13 and 14, it becomes apparent that in the present invention, when the rear wheel speed sensor 14 malfunctions, all three controller units 202, 204 and 206 are shut down quickly, while if either or both of the front wheel speed sensors 10 and 12 should malfunction, only the front controllers 202 and 204 will be shut down immediately and the rear controller unit 206 will be disabled after completion of the current anti-skid control operation. This provides the safety of a thorough fail-safe system without the danger of tricking the driver into trusting the anti-skid control system just before it quits.

In the above procedure, switching of the operation mode from skid-control mode to manual mode will be performed by holding the electromagnetic valves in the application mode position. In order to do this, the control signal is held at its LOW level.

FIG. 16 illustrates the main program for the anti-skid control system. Practically speaking, this program will generally be executed as a background job, i.e. it will have a lower priority than most other programs under the control of the same processor. Its first step 1006-1 is to wait until at least one sample period, covering a single sensor pulse or a group thereof, as described in more detail below, is completed as indicated when a sample flag FL has a non-zero value. In subsequent step 1006-2, the sample flag FL is checked for a value greater than one, which would indicate the sample period is too short. If this is the case, control passes to a sample control program labelled "2000". If FL=1, then the control process is according to plan, and control passes to a main routine explained later with reference to FIG. 18. Finally, after completion of the main routine, a time overflow flag OFL is reset to signify successful completion of another sample processing cycle in step 1006-3, and the main program ends.

FIG. 17 shows the interrupt program stored in the memory step 246 of ROM 238 and executed in response to the interrupt command generated by the interrupt command generator 229 whenever a sensor pulse is received. It should be noted that a counter value NC of an auxiliary counter 233 is initially set to 1, a register N representing the frequency divider ratio is set at 1, and a counter value M of an auxiliary counter 235 is set at −1. After starting execution of the interrupt program, the counter value NC of the auxiliary counter 233 is decremented by 1 at a step 3002. The auxiliary counter value NC is then checked at a step 3004 for a value greater than zero. For the first sensor pulse, since the counter value NC is decremented by 1 (1−1=0) at the step 3002 and thus is zero, the answer of the step 3004 is NO. In this case, the clock counter value t is latched in a temporary register 231 in the input interface 230 at a step 3006. The counter value NC of the auxiliary counter 233 is thereafter assigned the value N in a register 235, which register value N is representative of frequency dividing ratio determined during execution of the main routine explained later, at a step 3008. The value M of an auxiliary counter 235 is then incremented by 1. The counter value M of the auxiliary counter 235 labels each of a sequence of sample periods covering an increasing number of sensor pulses. After this, the sample flag FL is incremented by 1 at a step 3012. After the step 3012, interrupt program ends, returning control to the main program or back to step 3002, whichever comes first.

On the other hand, when the counter value NC is non-zero when checked at the step 3004, this indicates that not all of the pulses for this sample period have been received, and so the interrupt program ends immediately.

This interrupt routine thus serves to monitor the input timing t of each pulse sampling period, i.e. the time t required to receive NC pulses, and signals completion of each sample period (M=0 through M=10, for example) for the information of the main program.

Before describing the operation in the main routine, the general method of grouping the sensor pulses into sample periods will be explained to facilitate understanding of the description of the operation in the main routine.

In order to enable the controller unit 202 to accurately calculate the wheel acceleration and deceleration $a_w$, it is necessary that the difference between the pulse intervals of the single or grouped sensor pulses exceeding a given period of time, e.g. 4 ms. In order to obtain the pulse interval difference exceeding the given period of time, 4 ms, which given period of time will be hereafter referred to as "pulse interval threshold S", some sensor pulses are ignored so that the recorded input timing t of the sensor pulse groups can satisfy the following formula:

$$dT = (C-B) - (B-A) \geq S \text{ (4 ms.)} \tag{3}$$

where A, B and C are the input times of three successive sensor pulse groups.

The controller unit 202 has different sample modes, i.e. MODE 1, MODE 2, MODE 3 and MODE 4 determining the number of sensor pulses in each sample period group. In MODE 1 every sensor pulse input time is recorded and therefore the register value N is 1. In MODE 2, every other sensor pulse is ignored and the register value N is 2. In MODE 3, every fourth sensor pulse is monitored, i.e. its input time is recorded, and the register value N is 4. In MODE 4, every eighth sensor pulse is sampled and the register value N is then 8.

The controller unit 202 thus samples the input timing of three successive sensor pulses to calculate the pulse interval difference dT while operating in MODE 1. If the derived pulse interval difference is equal to or greater than the pulse interval threshold S, then sensor pulses will continue to be sampled in MODE 1. Otherwise, the input timing of every other sensor pulse is sampled in MODE 2 and from the sampled input timing of the next three sensor pulses sampled, the pulse interval difference dT is calculated to again be compared with the pulse interval threshold S. If the derived pulse interval difference is equal to or greater than the pulse interval threshold S, we remain in MODE 2. Otherwise, every four sensor pulses are sampled in MODE 3. The input timings of the next three sampled sensor pulses are processed to derive the pulse interval difference dT. The derived pulse interval difference dT is again compared with the pulse interval threshold S. If the derived pulse interval difference is equal to or greater than the pulse interval threshold S, the MODE remains at 3 and the value N is set to 4. On the other hand, if the derived pulse interval difference dT is less than the pulse interval threshold S, the mode is shifted to MODE 4 to sample the input timing of every eighth sensor pulse. In those MODE 4, the value N is set at 8.

Referring to FIG. 18, the main routine serves to periodically derive an updated wheel acceleration rate value $a_w$. In general, this is done by sampling larger and larger groups of pulses until the difference between the durations of the groups is large enough to yield an accurate value. In the main routine, the sample flag FL is reset to zero at a step 2001. Then the counter value M of the auxiliary counter 233, indicating the current sample period of the current $a_w$ calculation cycle, is read out at a step 2002 to dictate the subsequent program steps.

Specifically, after the first sample period (M=$\phi$), the input timing t temporarily stored in the temporary register 231 corresponding to the sensor pulse number (M=0) is read out and transferred to a memory step 240 of RAM at a block 2004, which memory block 240 will be hereafter referred to as "input timing memory". Then control passes to the step 2000-4 of the main program. When M=2, the corresponding input timing t is read out from the temporary register 231 and transferred to the input timing memory 240 at a step 2006. Then, at a step 2008, a pulse interval Ts between the sensor pulses of M=1 is derived from the two input timing values in the input timing memory 240. That is, the pulse interval of the sensor pulse (M=1) is derived by:

$$Ts = t_1 - t_0$$

where
$t_1$ is input time of the sensor pulse M1; and
$t_0$ is input time of the sensor pulse M0.

The derived pulse interval $T_s$ of the sensor pulse M1 is then compared with a reference value, e.g. 4 ms., at a step 2010. If the pulse interval $T_s$ is shorter than the reference value, 4 ms., control passes to a step 2012 wherein the value N and the pulse interval $T_s$ are multiplied by 2. The doubled timing value ($2T_s$) is again compared with the reference value by returning to the step 2010. The steps 2010 and 2012 constitute a loop which is repeated until the pulse interval ($2nT_s$) exceeds the reference value. When the pulse interval ($2nT_s$) exceeds the reference value at the step 2010, a corresponding value of N (2N) is automatically selected. This N value represents the number of pulses to be treated as a single pulse with regard to timing.

After setting the value of N and thus deriving the sensor pulse group size then the auxiliary counter value NC is set to 1, at a step 2016. The register value N is then checked for a value of 1, at a step 2018. If N=1, then the auxiliary counter value M is set to 3 at a step 2020 and otherwise control returns to the main program. When the register value N equals 1, the next sensor pulse, which would normally be ignored, will instead be treated as the sensor pulse having the sample period number M=3.

In the processing path for the sample period number M=3, the corresponding input timing is read from the corresponding address of the temporary register 231 and transferred to the input timing memory 240, at a step 2024. The pulse interval $T_2$ between the sensor pulses at M=1 and M=3 is then calculated at a step 2026. The derived pulse interval $T_2$ is written in a storage section of a memory step 242 of RAM 236 for a current pulse interval data, which storage section will be hereafter referred to as "first pulse interval storage" and which memory step 242 will be hereafter referred to as "pulse interval memory". After the step 2026, control returns to the main program to await the next sensor pulse, i.e. the sensor pulse for sample period number M=4.

When the sensor pulse for M=4 is received, the value t of the temporary register 231 is read out and transferred to the input timing memory 240 at step 2028. Based on the input timing of the sensor pulses for M=3 and M=4, the pulse interval $T_3$ is calculated at a step 2030. The pulse interval $T_3$ derived at the step 2030 is then written into the first pulse interval storage of the pulse interval memory. At the same time, the pulse interval data $T_2$ previously stored in the first pulse interval storage is transferred to another storage section of the pulse interval memory adapted to store previous pulse interval data. This other storage section will be hereafter referred to as "second pulse interval storage". Subsequently, at a step 2032 the contents of the first and second storages, i.e. the pulse interval data $T_2$ and $T_3$ are read out. Based on the read out pulse interval data $T_2$ and $T_3$, a pulse interval difference dT is calculated at step 2032 and compared with the pulse interval threshold S to determine whether or not the pulse interval difference dT is large enough for accurate calculation of wheel acceleration or deceleration $a_w$. If so, process goes to the step 2040 to calculate the wheel acceleration or deceleration according to the equation (1). The register value N is then set to 1 at the step 2044 and thus MODE 1 is selected. In addition sample period number M is reset to −1, and the $a_w$ derivation cycle starts again. On the other hand, if at the step 2032 the pulse interval difference dT is too small to calculate the wheel acceleration or deceleration $a_w$, then the value N is multiplied by 2 at a step 2034. Due the updating of the value N, the sample mode of the sensor pulses is shifted to the next mode.

When the step 2034 is performed and thus the sample mode is shifted to MODE 2 with respect to the sensor pulse of M=4', the sensor pulses $c_2$ input following to the sensor pulse of M=4' is ignored. The sensor pulses $c_3$ following to the ignored sensor pulse $c_2$ is then taken as the sensor pulse to be sampled as M=3". At this time, the sensor pulse of M=4' is treated as the sensor pulse of M=2" and the sensor pulse of M=2 is treated as the sensor pulse of M=1". Therefore, calculation of the interval difference dT and discrimination if the derived interval difference dT is greater than the pulse interval threshold S in the step 2032 will be carried out with respect to the sensor pulse $c_3$ which will be treated as the sensor pulse of M=4". The steps 2032 and 2034 are repeated until the interval difference greater than the pulse interval threshold S is obtained. The procedure taken in each cycle of repetition of the steps 2032 and 2034 is substantially same as that set forth above.

As set forth above, by setting the counter value NC of the auxiliary counter 233 to 1 at the step 2016, the input timing of the sensor pulse received immediately after initially deriving the sample mode at the steps 2010 and 2012 will be sampled as the first input timing to be used for calculation of the wheel acceleration and deceleration. This may be contrasted with the procedure taken in the known art.

FIG. 19 shows the output program for deriving the wheel speed $V_w$, wheel acceleration and deceleration $a_w$ and slip rate R, selecting the operational mode, i.e. application mode, hold mode and release mode and outputting an inlet signal EV and/or an outlet signal AV depending upon the selected operation mode of the actuator 16.

When the application mode is selected the inlet signal EV goes HIGH and the outlet signal EV goes HIGH. When the release mode is selected, the inlet signal EV goes LOW and the outlet signal AV also goes LOW. When the selected mode is the hold mode, the inlet signal EV remains HIGH while the outlet signal AV goes LOW. These combinations of the inlet signal EV and the outlet signal AV correspond to the actuator supply current levels shown in FIG. 11 and thus actuate the electromagnetic valve to the corresponding positions illustrated in FIGS. 4, 5 and 6.

The output program is stored in the memory step 254 and adapted to be read out periodically, e.g. every 10 ms, to be executed as an interrupt program.

During execution of the output calculation program, the pulse interval T is read out from a memory step 241 of RAM which stores the pulse interval, at a step 5002. As set forth above, since the pulse interval T is inversely proportional to the wheel rotation speed $V_w$, the wheel speed can be derived by calculating the reciprocal (1/T) of the pulse interval T. This calculation of the wheel speed $V_w$ is performed at a step 5004 in the output program. After the block 5004, the target wheel speed $V_i$ is calculated at a step 5006. The manner of deriving the target wheel speed $V_i$ has been illustrated in the U.S. Pat. No. 4,392,202 to Toshiro MATSUDA, issued on July 5, 1983, No. 4,384,330 also to Toshiro MATSUDA, issued May 17, 1983 and No. 4,430,714 also to Toshiro MATSUDA, issued on Feb. 7, 1984, which are all assigned to the assignee of the present invention. The disclosure of the above-identified three United States Patents are hereby incorporated by reference for the sake of disclosure. As is obvious herefrom, the target wheel speed $V_i$ is derived as a function of wheel speed deceleration as actually detected. For instance, the wheel speed $V_w$ at which the wheel deceleration $a_w$ exceeds the deceleration threshold $a_{ref}$, e.g. $-1.2$ G is taken as one reference point for deriving the target wheel speed $V_i$. The wheel speed at which the wheel deceleration $a_w$ also exceeds the deceleration threshold $a_{ref}$, is taken as the other reference point. Based on the wheel speed $V_{w1}$ and $V_{w2}$ and the measured period P, the deceleration rate $dV_i$ is derived from:

$$dV_i = (V_{w1} - V_{w2})/P \qquad (4)$$

This target wheel speed $V_i$ is used for skid control in the next skid cycle.

It should be appreciated that in the first skid cycle, the target wheel speed $V_i$ cannot be obtained. Therefore, for the first skid cycle, a predetermined fixed value will be used as the target wheel speed $V_i$.

At step 5008 of FIG. 19, the slip rate R is calculated according to the foregoing formula (2). Subsequently, the operational mode is determined on the basis of the wheel acceleration and deceleration $a_w$ and the slip rate R, at a step 5010.

Figure 20:
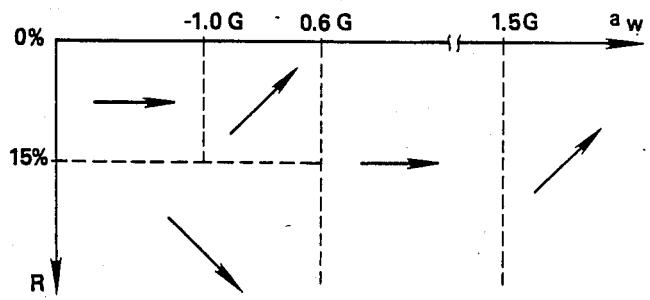
FIG. 20 is a table determining the operation mode of the actuator, which table is accessed in terms of the wheel acceleration and deceleration and the slip rate.

FIG. 20 shows a table used in determining or selecting the operational mode of the actuator 16 and which is accessed according to the wheel acceleration and deceleration $a_w$ and the slip rate R. As can be seen, when the wheel slip rate R is in the range of 0 to 15%, the hold mode is selected when the wheel acceleration and deceleration $a_w$ is lower than $-1.0$ G and the application mode is selected when the wheel acceleration and deceleration $a_w$ is in the range of $-1.0$ G to 0.6 G. On the other hand, when the slip rate R remains above 15%, the release mode is selected when the wheel acceleration and deceleration $a_w$ is equal to or less than 0.6 G, and the hold mode is selected when the wheel acceleration and deceleration is in a range of 0.6 G to 1.5 G. When the wheel acceleration and deceleration $a_w$ is equal to or greater than 1.5 G, the application mode is selected regardless of the slip rate.

According to the operational mode selected at the step 5010 in FIG. 19, the signal levels of the inlet signal EV and the outlet signal AV are determined so that the combination of the signal levels corresponds to the selected operation mode of the actuator 16. The determined combination of the inlet signal EV and the outlet signal AV are output to the actuator 16 to control the electromagnetic valve.

It should be appreciated that, although the execution timing of the output calculation program has been specified to be about 10 ms in the foregoing disclosure, the timing is not necessarily fixed to the mentioned timing and may be selectable from the approximate range of 1 ms to 20 ms. The execution timing of the output program is fundamentaly to be determined in accordance with the response characteristics of the actuator.

Figure 21:
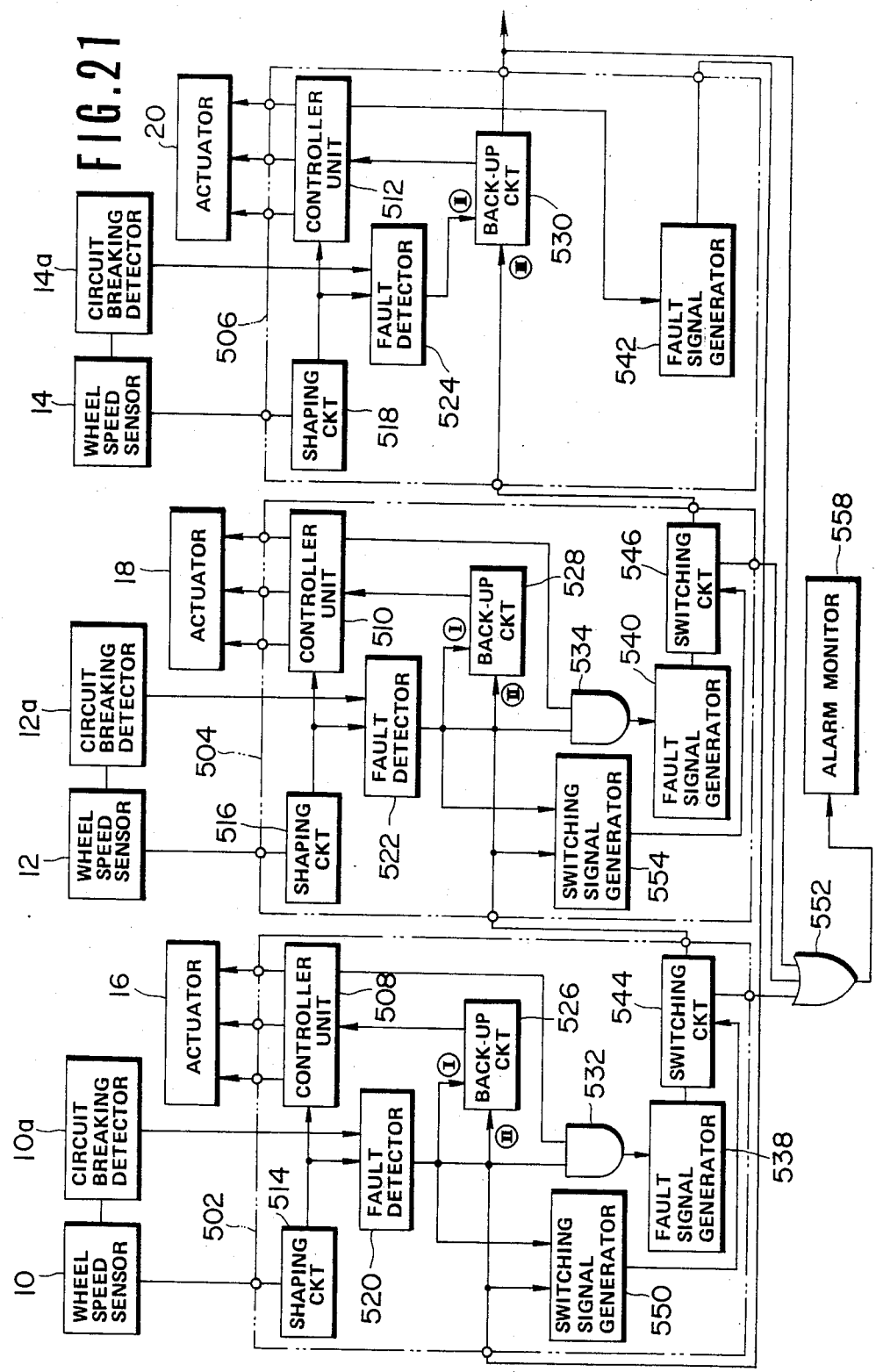
FIG. 21 is a schematic step diagram of another embodiment of an anti-skid brake control system according to the present invention.

FIG. 21 shows another embodiment of the anti-skid brake control system according to the present invention, which performs a fail-safe function similar to that described with respect to the first embodiment. In this embodiment, each of the front-left, front-right and rear anti-skid control systems 502, 504 and 506 is provided with a controller unit 508, 510 and 512. The controller units 508, 510 and 512 are connected to the corresponding wheel speed sensors 10, 12 and 14 via shaping circuits 514, 516 and 518. The controller units 508, 510 and 512 all have the same circuitry. The controller unit 508 has been illustrated in more detail in FIG. 22 and will be described later.

The controller units 508, 510 and 512 are connected to electromagnetic actuators 16, 18 and 20 of the corresponding pressure control valves 16a, 18a and 20a to actuate the valve to one of its application, release and hold positions. In order to control the pressure control valve positions, each controller unit 508, 510 and 512 sends an inlet signal EV and outlet signal AV to the corresponding actuator 16, 18 and 20. The actuator 16, 18 and 20 operates the pressure control valve 16a, 18a and 20a depending upon the combinations of the inlet signal EV and the outlet signal AV, which combinations are as follows:

|  | EV | AV |
| --- | --- | --- |
| Application mode | HIGH | HIGH |
| Hold mode | HIGH | LOW |
| Release mode | LOW | LOW |

Each anti-skid control system 502, 504 and 506 is further provided with a fault detector 520, 522 and 524 which is adapted to compare the sensor signal pulse intervals of the corresponding sensor with those of the others to detect discrepancies in the pulse interval. By detecting when the sensor signal pulse interval is excessively longer than those of other sensors, short circuits can be detected. Each fault detector 520, 522 and 524 produces a detector signal when a pulse interval discrepancy greater than a given value is detected.

In addition, each wheel speed sensor 10, 12 and 14 is accompanied by a circuit-breaking detector 10a, 12a and 14a which applies a seek detector current to the coil 126 of the wheel speed sensor, monitors the voltage across the coil, and produces a detector signal when the detected voltage becomes higher than a given value. Each circuit breaking detector 10a, 12a and 14a is connected to the corresponding fault detector 520, 522 and 524. The fault detectors 520, 522 and 524 are also responsive to the detector signal from the corresponding circuit-breaking detectors 10a, 12a and 14a to produce the detector signal.

Each fault detector 520, 522 and 524 is connected to a corresponding back-up circuit 526, 528 and 530. The back-up circuits 526, 528 and 530 are responsive to the detector signal from the fault detector to send a back-up signal to the corresponding controller unit 508, 510 and 512. The controller units 508, 510 and 512 are responsive to the back-up signal from the back-up circuit to latch both inlet and outlet signal levels HIGH so as to hold the corresponding pressure control valve 16a, 18a and 20a in the APPLICATION MODE. As is the APPLICATION MODE of the pressure control valve is maintained throughout the back-up operation in response to failure of the wheel speed sensor, braking pressure can be adjusted by manual adjustment of depression of a brake pedal.

The detector signal from each of the fault detectors 520 and 522 is sent to one input terminal of a corresponding AND gate 532 and 534, the output terminal of which is connected to a corresponding fault signal generator 538 and 540. The other input terminal of the AND gate 532 and 534 is connected to the corresponding controller unit 508 and 510 to receive a signal indicative of disablement or termination of the anti-skid control operation from the controller unit 508 and 510. Specifically, while the controller unit is in operation performing anti-skid brake control operation, the input level at the AND gate remains LOW and when the controller unit is inoperative, the input from the controller unit goes HIGH. On the other hand, the detector signal from the fault detector is HIGH when malfunction of the wheel speed sensor is detected by detecting when the pulse intervals of the different sensors do not match. Therefore, only when the controller unit is inoperative and the fault detector detects malfunction of the wheel speed sensor is the AND gate opened to send a gate signal to the fault signal generator. The fault signal generator is responsive to the gate signal to feed the fault signal to a corresponding switching circuit 544 and 546. In the normal position, the switching circuit 544 connects the fault signal generator 538 of the front-left anti-skid control system 502 to the back-up circuit 528 of the front-right anti-skid control system 504. In response to the fault signal from the fault signal generator 538 of the front-left anti-skid control system, the back-up circuit 528 become active to hold the inlet and outlet signals EV and AV HIGH to allow manual braking operation.

At th same time, the fault signal produced by the fault signal generator 538 is sent to one input terminal of the AND gate 534 which is, in turn, connected to the fault signal generator 540. The other input terminal of the AND gate 534 is connected to the controller unit 504 to receive a HIGH-level signal when the controller unit is inoperative. Therefore, similarly to the fault signal generator 538 in the front-left anti-skid control system 502 the fault signal generator 540 produces a fault signal whenever the fault signal is sent by the fault signal generator 538 or the fault detector 522 detects malfunction of wheel speed sensor 18 and thus sends a HIGH-level detector signal thereto, while the controller unit 510 is inoperative.

The fault signal generator 540 is connected to the back-up circuit 530 of the rear anti-skid control system 506 via switching circuit 546. Substantially the same procedure as set forth above is peformed by the rear anti-skid control system to disable anti-skid brake control and switch the operation mode to the manual mode, and to activate the fault signal generator 542 to output a fault signal. The fault signal produced by the fault signal generator 542 is sent to the back-up circuit 526 of the front-left anti-skid control system 502 and, at the same time, to the fault signal generator 538 via the AND gate 532. Also, the fault signal of the fault signal generator 542 is sent to a switching signal generator 550 to operate the latter to feed the switching signal to the switching circuit 544. In response to the switching signal from the switching signal generator 550, the switching circuit 544 switches electric connection to connect the fault signal generator 538 to one input terminal of an OR gate 552. The OR gate 552 is also connected to the switching circuit 546 and the fault signal generator 542 in the front-right and rear anti-skid control systems 504 and 506, the former being responsive to a switching signal from switching signal generators 554. Similarly to the switching signal generator 550, the switching signal generator 554 is responsive to the fault signal from the fault signal generator 538 to send a switching signal to the corresponding switching circuit 546.

The OR gate 552 is responsive to a HIGH-level signal from any of the switching circuits 544 and 546 and the fault signal generator 542 to activate an alarm monitor 558 to produce an alarm.

In the rear anti-skid control system 506, the switching circuit, the AND gate and switching signal generator appearing in the foregoing control systems 502 and 504 are not needed. In addition, the fault signal generator 542 is connected only to the controller unit 512. Therefore, the fault signal generator 542 produces the fault signal only when the controller is halted due to an error in one of wheel speed sensors 10, 12 and 14. In order to make the fault signal generator active only when the controller unit 512 is halted due to malfunction of a wheel speed sensor, the controller unit is adapted to send a disablement indicative signal directly to the fault signal generator.

When malfunction of the wheel speed sensor 14 is detected, the operation mode is switched to the manual mode. As soon as the operation mode is switched to the manual mode, the fault signal generator 542 becomes active in response to HIGH level signal from the controller unit 512 to send the fault signal to the back-up circuit 526 of the front-left anti-skid control system 502. As a result, the front-left and the front-right anti-skid control systems are disabled to switch operation into the manual mode.

This sequence of back-up operation may safely perform switching of the operation mode into the manual mode while preventing skidding of the rear wheels.

Figure 22:
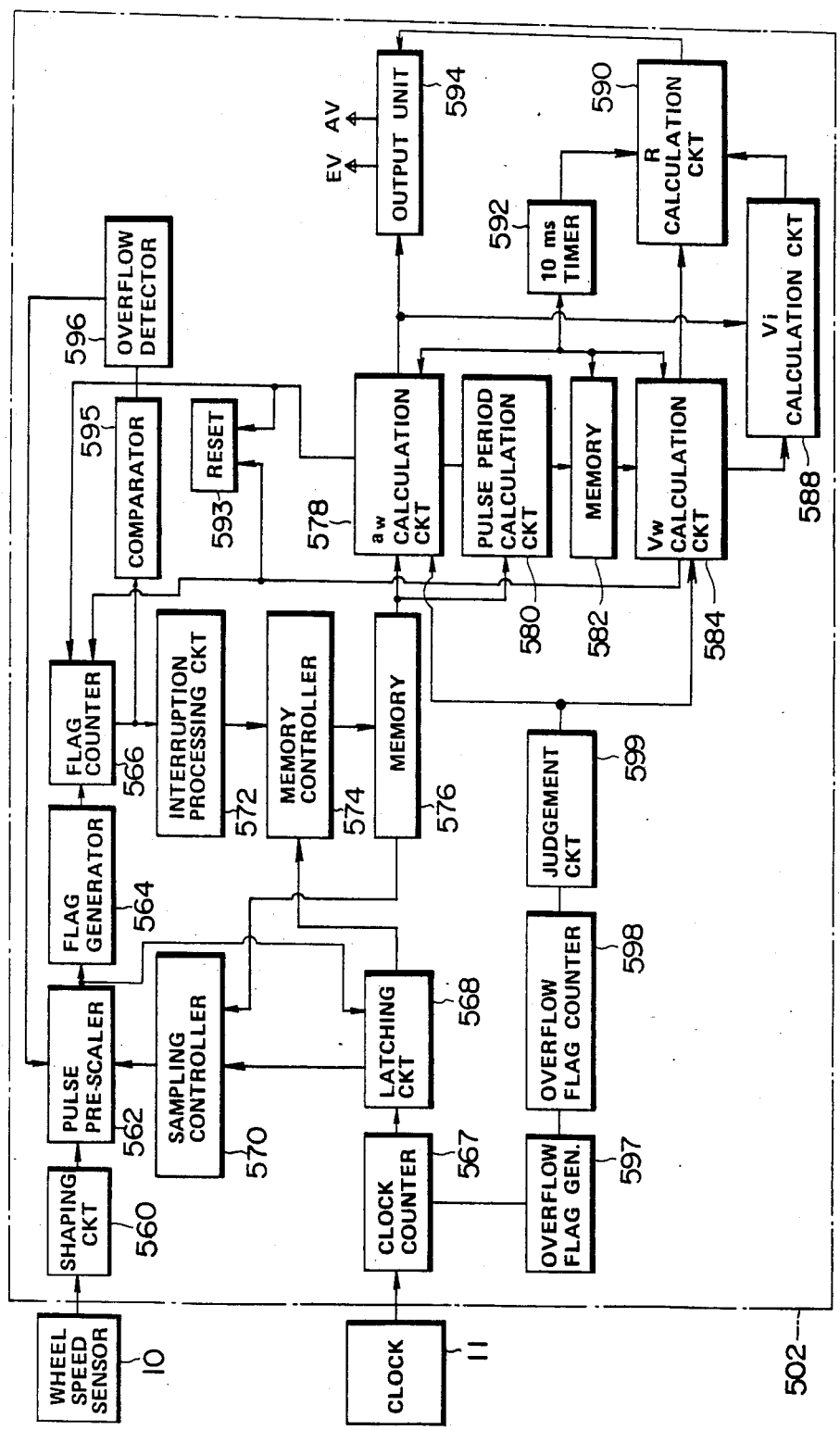
FIG. 22 is a step diagram of the controller unit in the anti-skid brake control system of FIG. 21.

In FIG. 22, the wheel speed sensor 10 is connected to a shaping circuit 560 provided in the controller unit 502. The shaping circuit 560 produces the rectangular sensor pulses having a pulse interval inversely proportional to the wheel speed $V_w$. The sensor pulse output from the shaping circuit 560 is fed to a pulse pre-scaler 562 which counts the sensor pulses to produce a sample command for sampling input timing when the counter value reaches a predetermined value. The predetermined value to be compared with the counter value in the pulse pre-scaler 562 is determined such that the intervals between the pairs of three successive sample commands will be sufficiently different to allow calculation of the wheel acceleration and deceleration rate.

The sample command is fed to a flag generator 564. The flag generator 564 is responsive to the sample command to produce a flag signal. The flag signal of the flag generator 564 is fed to a flag counter 566 which is adapted to count the flag signals and output a counter signal having a value representative of its counter value.

At the same time, the sample command of the pulse pre-scaler 562 is fed to a latching circuit 568 which is adapted to latch the signal value of a clock counter signal from a clock counter 567 counting the clock pulse output by a clock generator 11. The latched value of the clock counter signal is representative of the input timing of the sensor pulse which activates the pulse pre-scaler 562 to produce the sample command. The latching circuit 568 sends the input timing indicative signal having a value corresponding to the latched clock counter signal value, to a memory controller 574. The memory controller 574 is responsive to a memory command input from an interrupt processing circuit 572 which in turn is responsive to the flag counter signal to issue a memory command which activates the memory controller 574 to transfer the input timing indicative signal from the latching circuit 568 to a memory 576. The memory 576 sends the stored input timing indicative signal to a sample controller 570 whenever the input timing signal value corresponding to the latched value of the latching circuit 568 is written therein. The sample controller 570 performs operations substantially corresponding to that performed in the steps 2008, 2010, 2012, 2032 and 2034 in FIG. 18, i.e. it determines the number of sensor pulses in each group to be ignored. The sample controller 570 outputs a pulse number indicative signal to the pulse pre-scaler 562, which pulse number indicative signal has a value approximating the predetermined value to be compared with the counter value in the pulse pre-scaler 562.

The memory 576 also feeds the stored input timing indicative signal to a wheel acceleration and deceleration calculation circuit 578 and a pulse interval calculation circuit 580. The wheel acceleration and deceleration calculation circuit 578 first calculates a pulse interval difference between pairs of three successively sampled sensor pulses. The obtained pulse interval difference is compared with a reference value so as to distinguish if the pulse interval difference is great enough to allow calculation of the wheel acceleration and deceleration $a_w$. If the obtained pulse interval difference is greater than the reference value, then the wheel acceleration and deceleration calculation circuit 578 performs calculation of the wheel acceleration and deceleration according to the foregoing formula (1). If the obtained pulse interval difference is smaller than the reference value, the wheel acceleration and deceleration calculation circuit 578 shifts the operational mode thereof in a manner substantially corresponding to the procedure disclosed with reference to FIG. 18, so as to achieve a pulse interval difference large enough to permit the wheel acceleration and deceleration calculation. On the other hand, the pulse interval calculation circuit 580 performs calculations to obtain the pulse interval between the current pulse and the immediate preceding pulse and sends a pulse interval indicative signal to a memory 582. The memory 582 sends a stored pulse interval indicative signal to a wheel speed calculation circuit 584 which is associated with a 10 ms timer 592. The 10 ms timer 292 produces a timer signal every 10 ms to activate the wheel speed calculation circuit 584. The wheel speed calculation circuit 584 is responsive to the timer signal to perform calculation of the wheel speed $V_w$ by calculating the reciprocal value of the pulse interval indicative signal from the memory 582. The wheel speed calculation circuit 584 thus produces a wheel speed indicative signal to be fed to a target wheel speed calculation circuit 588 and to a slip rate calculation circuit 590 which is also associated with the 10 ms timer to be activated by the timer signal every 10 ms.

The target wheel speed calculation circuit 588 is adapted to detect the wheel speed $V_w$ at which the wheel acceleration and deceleration $a_w$ calculated by the wheel acceleration and deceleration calculating circuit 578 exceeds than a predetermined deceleration rate $-b$. The target wheel speed calculation circuit 588 measures the interval between times at which the wheel deceleration exceeds the predetermined deceleration value. Based on the wheel speed at the foregoing times and the measured period of time, the target wheel speed calculation circuit 588 derives a decelerating ratio of the wheel speed to produce a target wheel speed indicative signal. The target wheel indicative signal of the target wheel speed calculation circuit 588 and the wheel speed indicative signal from the wheel speed calculation circuit 584 are fed to a slip rate calculation cicuit 590.

The slip rate calculation circuit 590 is also responsive to the timer signal from the 10 ms timer 592 to perform calculation of the slip rate R based on the wheel speed indicative signal from the wheel speed calculation circuit 584 and the target wheel speed calculation circuit 588, in accordance with the formula (2).

The slip rate calculation circuit 590 and the wheel acceleration and deceleration calculation circuit 578 are connected to an output unit 594 to feed the acceleration and deceleration indicative signal and the slip rate control signal thereto. The output unit 294 determines the operation mode of the actuator 16 based on the wheel acceleration and deceleration indicative signal value and the slip rate indicative signal value according to the table of FIG. 20. The output unit 594 thus produces the inlet and outlet signals EV and AV with a combination of signal levels corresponding to the selected operation mode of the actuator.

On the other hand, the wheel speed calculation circuit 584 is also connected to the flag counter 566 to feed a decrementing signal whenever the calculation of the wheel speed is completed and so decrement the counter value of the flag counter by 1. The flag counter 566 is also connected to a comparator 595 which is adapted to compare the counter value of the flag counter with a reference value, e.g. 2. When the counter value of the flag counter 566 is greater than or equal to the reference value, the comparator 595 outputs a comparator signal to an overflow detector 596. The overflow detector 596 is responsive to the comparator signal to feed a sample mode shifting command to be fed to the pulse pre-scaler 562 to shift the sample mode to increase the number of the sensor pulses in each sample group.

On the other hand, the clock counter 567 is connected to an overflow flag generator 597 which detects when the counter value reaches the full count of the clock counter to produce an overflow flag signal. The overflow flag signal of the overflow flag generator 597 is fed to an overflow flag counter 598 which is adapted to count the overflow flag signals and send an overflow counter value indicative signal to a judgment circuit 599. The judgment circuit 599 compares the overflow counter indicative signal value with a reference value e.g. 2. The judgment circuit 599 produces a reset signal when the overflow counter indicative signal value is equal to or greater than the reference value. The reset signal resets the wheel acceleration and deceleration calculation circuit 578 and the wheel speed calculation circuit 584 to zero. On the other hand, the overflow flag counter is connected to the wheel speed calculation circuit 584 and is responsive to the decrementing signal output from the wheel speed calculation circuit as set forth above to be reset in response to the decrementing signal.

Figure 23:
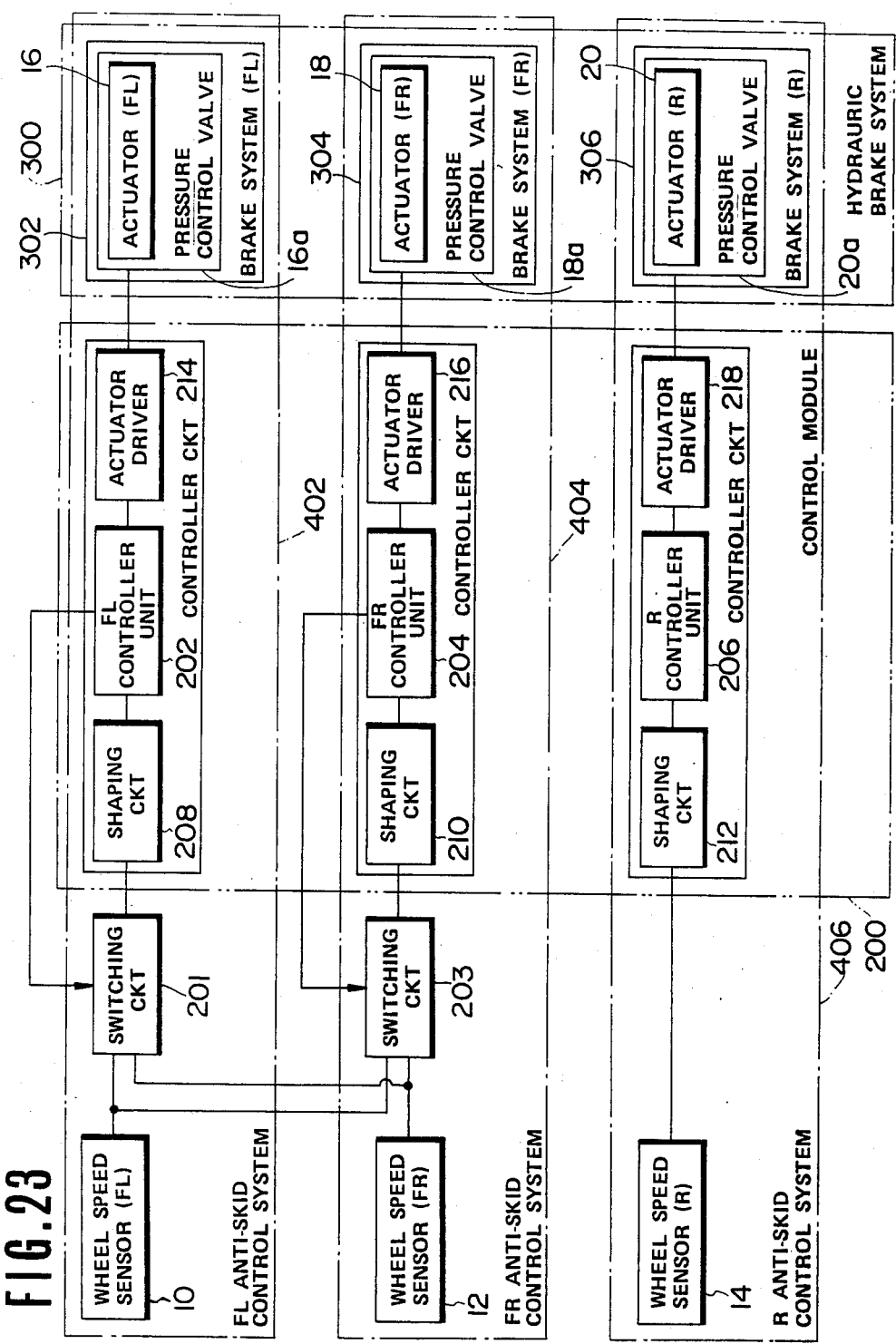
FIG. 23 is a schematic step diagram of another embodiment of an anti-skid brake control system according to the present invention.
Figure 24:
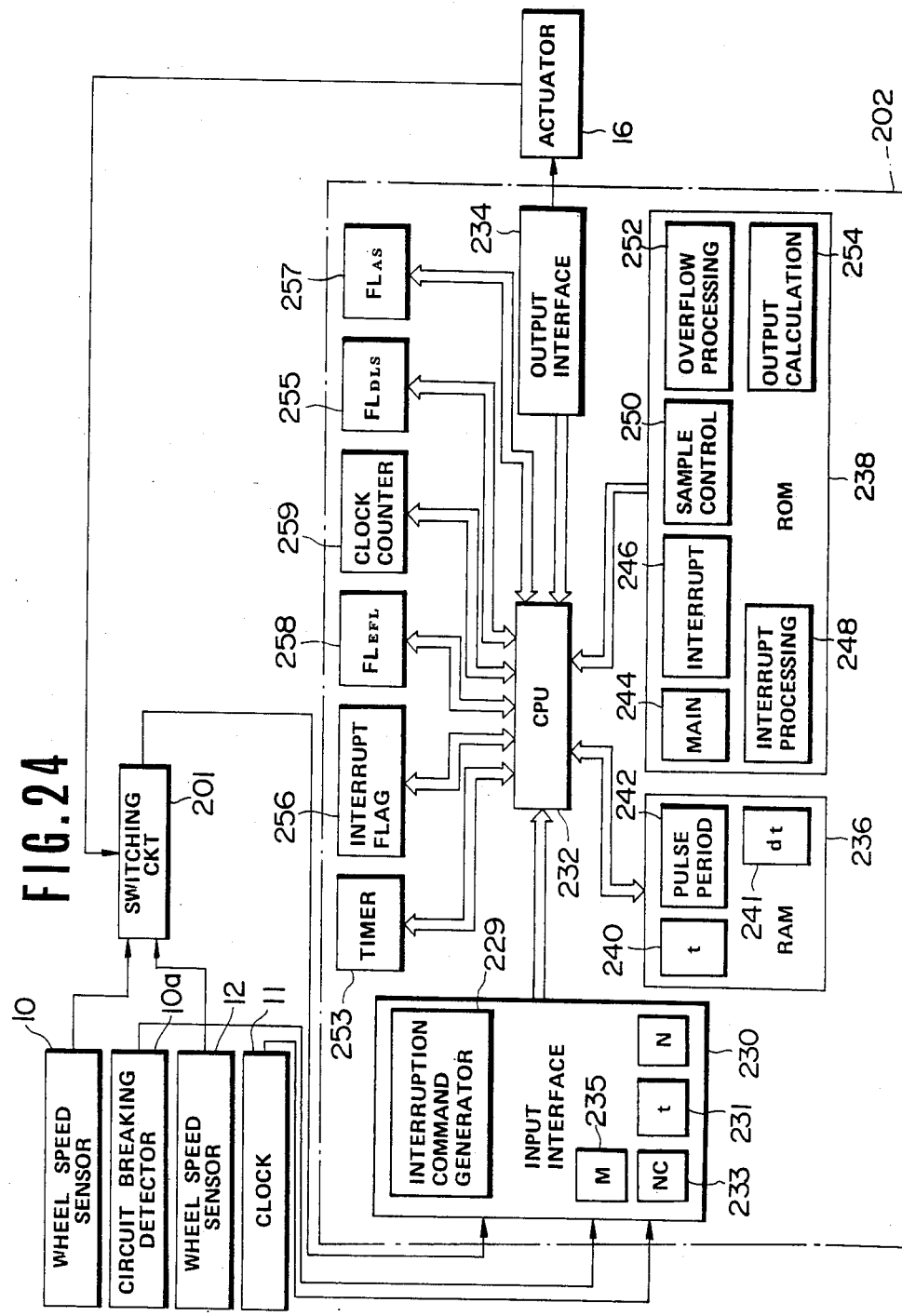
FIG. 24 is a step diagram of a controller unit in the anti-skid control system of FIG. 23.

FIGS. 23 and 24 shows a further embodiment of the anti-skid brake control system according to the present invention. As seen in FIGS. 23 and 24, according to this embodiment, the wheel speed sensor 10 for detecting the rotation speed of the front-left wheel is connected to the controller unit 202 via a switching circuit 201. The switching circuit 201 is also connected to the wheel speed sensor 12 which detects the rotation speed of the front-right wheel. The switching circuit 201 normally connects the wheel speed sensor 10 to the controller unit 202 but in response to failure of wheel speed sensor 10, its switches to connect the controller unit 202 to the wheel speed sensor 12. The controller unit 202 then receives the sensor signal pulses from the wheel speed sensor 12 and performs anti-skid control operation on the basis of wheel speed parameters of the front-right wheel.

Similarly, the controller unit 204 in the front-right anti-skid control system 404 is connected to the wheel speed sensor 12 via a switching circuit 203. The switching circuit 203 is also connected to the wheel speed sensor 10. The switching circuit 203 normally connects the wheel speed sensor 12 to the controller unit 204. However, when failure of the wheel speed sensor 12 is detected, the switching circuit 203 changes its switch position to connect the controller unit to the wheel speed sensor 10.

The circuitry of each controller unit 202, 204 and 206 is substantially the same as that illustrated in FIG. 12. Therefore, in order to avoid redundant disclosure, detailed description of the controller units 202, 204 and 206 will be omitted. Similarly, the circuit-breaking detectors 10a, 12a, 14a and associated connections are omitted from FIG. 23 for the sake of clarity.

Figure 25:
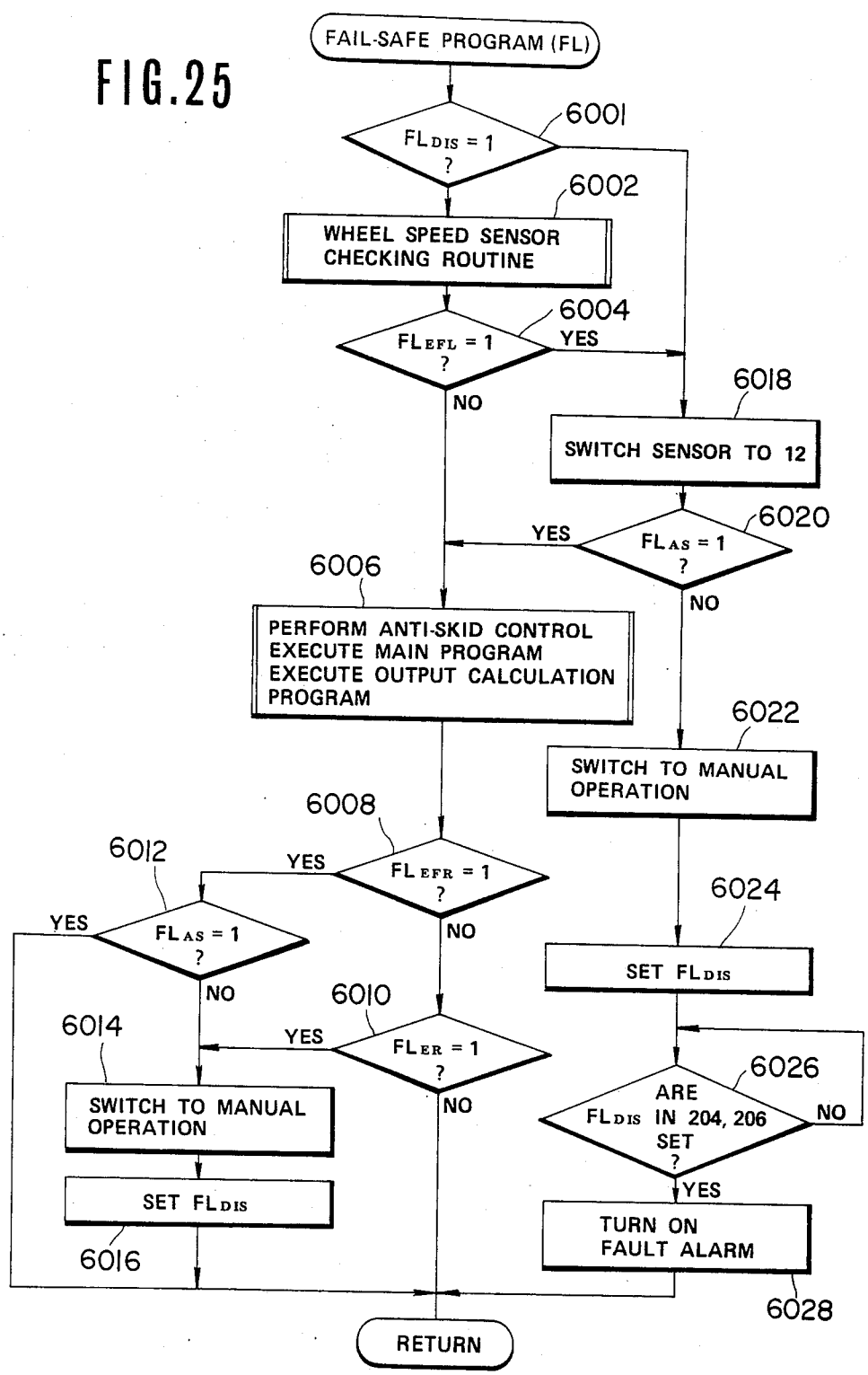
FIG. 25 is a flowchart of a fail-safe program to be executed by the controller unit in the anti-skid brake control system of FIG. 24.

FIG. 25 is a flowchart of a fail-safe program to be executed by the controller units 202 and 204. FIG. 25 specifically shows the program for the controller unit 202; the program for controller 204 will be have the same control flow acting on analogous flags and devices. The corresponding program for the rear controller 206 will not be shown as the differences between that program and FIG. 25 coincide with the differences between FIGS. 13 and 14.

In the initial step 6001, the disable flag $FL_{DIS}$ is checked. If not set, then the wheel speed checking routine illustrated in FIG. 15, is executed at the step 6002. Error flag $FL_{EFL}$ is then checked at a step 6004. If error flag $FL_{EFL}$ is not set, anti-skid control is performed in the normal way at a step 6006. Thereafter, the error flag $FL_{EFR}$ is again checked at step 6008. If not set, the error flag $FL_{ER}$ is checked at a step 6010. If both of the flags are not set, the program ends. On the other hand, when if the error flag $FL_{EFR}$ is set, the operation flag $FL_{AS}$ is checked at a step 6012. When the operation flag $FL_{AS}$ is set, then execution of program ends. Otherwise, the operation mode is switched from the control mode to the manual mode by disabling anti-skid control and holding the pressure control valve position at the APPLICATION MODE position, at a step 6014. After this, the disable flag $FL_{DIS}$ is set in the flag register 255 in step 6016.

On the other hand, if the error flag $FL_{ER}$ in the rear anti-skid control system is set when checked at the step 6010, the operation mode is immediately switched to the manual mode at the step 6014.

When malfunction of wheel speed sensor 10 is detected when checked at the step 6002, then the switching circuit 201 is activated to connect the controller unit 202 to the wheel speed sensor 12 for the front-right wheel, at a step 6018. After this the operation flag $FL_{AS}$ is checked at a step 6020. If the operation flag $FL_{AS}$ is set, control passes to step 6006 and otherwise, the anti-skid control system is disabled by switching the control mode to the manual mode, at a step 6022. Thereafter, at a step 6024, the disable flags $FL_{DIS}$ of the other controller units 204 and 206 are checked and after both of these disable flags are set, an alarm is produced at a step 6028.

FIG. 26 is a step diagram of yet another embodiment of the anti-skid brake control system according to the present invention. The embodiment follows a procedure similar to that illustrated with respect to FIG. 25.

In FIG. 26, the wheel speed sensors 10 and 12 for front-left and front-right wheels are respectively connected to shaping circuits 614 and 616 of front-left and front-right anti-skid control systems via switching circuits 618 and 620. The shaping circuits 614 and 616 are respectively connected to controller units 608 and 610 to supply sensor signal pulses thereto. The wheel speed sensor 14 for the rear wheels is connected to the shaping circuit 622 of a rear anti-skid control system including a controller unit 612. Each of the wheel speed sensors 10, 12 and 14 are also connected for output to a fault detector circuit 624.

In this embodiment, each wheel speed sensor 10, 12 and 14 is supplied with a constant voltage which defines a minimum sensor signal level. The fault detector circuit 624 checks the output level of each wheel speed sensor and produces a fault signal indicative of failure of a given wheel speed sensor when the corresponding output level drops below the minimum level. When failure of one of the wheel speed sensor is detected, the fault detector circuit 624 sends the corresponding fault signal to a back-up circuit 626. The back-up circuit 626 performs back-up operations according to the following schedule.

1. When the wheel speed sensor 10 fails:
   (1) activate the switching circuit 618 to connect the controller unit 608 to the wheel speed sensor 12;
   (2) perform anti-skid control for the front-left wheel by means of sensor signals from the wheel speed sensor 12;
   (3) continue anti-skid control for front-right and rear wheels as under normal conditions;
   (4) produce an alarm after the anti-skid operation of all of the anti-skid control systems 602, 604 and 606 end; and
   (5) simultaneous with (4), switch the operation modes of all the anti-skid control systems to manual mode.

2. When the wheel speed sensor 12 fails:
   (1) activate the switching circuit 620 to connect the controller unit 610 to the wheel speed sensor 10;
   (2) perform anti-skid control for the front-left wheel by means of sensor signals from the wheel speed sensor 10;
   (3) continue anti-skid control for front-left and rear wheels as under normal conditions;

(4) produce an alarm after the anti-skid operation of all of the anti-skid control systems 602, 604 and 606 end; and (5) simultaneous with (4), switch the operation modes of all the anti-skid control systems to manual mode.

3. When the wheel speed sensor 14 fails:

(1) switch the operation modes of all the anti-skid control systems 602, 604 and 606 to manual mode; and (2) at the same time, produce an alarm.

In order to perform the aforementioned procedure, the back-up circuit 626 is connected to the switching circuits 618 and 620 to supply switching commands. Also, the back-up circuit 626 is connected to the controller units 602, 604 and 606 to supply fault indicative signals and to receive therefrom a signal indicative of absence or termination of anti-skid control. The back-up circuit 626 is also connected to an alarm generator circuit 628 which comprises a switching transistor 630, a switching relay 632 and an alarm indicator lamp 634.

The back-up circuit 626 performs the back-up operation specified by the aforementioned schedule when the corresponding wheel speed sensor fails.

As set forth, according to the present invention, a fail-safe operation is effectively performed to assure security of the vehicle brake system when one of wheel speed sensors is damaged or the harness thereof is disconnected, resulting in failure.

Thus, the invention fulfills all of the objects and advantages sought therefor.

What is claimed is:

1. An anti-skid brake control system for an automotive vehicle comprising:

a hydraulic brake system including a plurality of brake circuits, each having one or more wheel cylinders for applying braking force to corresponding vehicle wheels, and one or more pressure control valves for controlling fluid pressure in the corresponding wheel cylinders so as to control the rotation speed of the wheels to maintain wheel slippage at a predetermined optimum value;

a plurality of sensors, each associated with corresponding vehicle wheels, each of said sensors producing wheel speed indicative digital signals;

a control module including a plurality of controllers, each corresponding to one of said brake circuits to control one of said corresponding pressure control valves, each of said controllers operating independently to measure an elapsed time from occurrence of said digital signals to record the input timing of said digital signals, to derive brake control variables on the basis of the recorded input timings, and to derive a control signal for actuating the corresponding pressure control valves to adjust the wheel speed toward said predetermined optimal slippage value, and each of said controllers being responsive to failure of one of said plurality of sensors to perform a back-up operation in which the brake system is switched to a manual operation mode, said plurality of controllers other than the controller corresponding to a faulty sensor maintaining anti-skid control operation until completion of an on-going anti-skid cycle of brake control operations and subsequently performing said back-up operation for switching to said manual operation mode.

2. The anti-skid brake control system as set forth in claim 1, wherein said plurality of brake circuits include a first brake circuit for applying braking force to one undriven wheel, a second brake circuit for applying braking force to another undriven wheel, and a third brake circuit for applying braking force to driven wheels of said vehicle.

3. The anti-skid brake control system as set forth in claim 2, wherein said plurality of controllers includes a first controller corresponding to said first brake circuit for controlling braking pressure in said first brake circuit, a second controller corresponding to said second brake circuit for controlling braking pressure in said second brake circuit, and a third controller corresponding to said third brake circuit for controlling braking pressure in said third brake circuit.

4. The anti-skid brake control system as set forth in claim 3, wherein said plurality of sensors includes first, second and third sensors and wherein said first, second and third controllers are connected to said first, second and third sensors, respectively.

5. The anti-skid brake control system as set forth in claim 4, wherein each of said controllers is operative for switching to said manual operation mode upon a failure of the corresponding sensor.

6. The anti-skid brake control system as set forth in claim 5, wherein each of said controllers is operable for detecting when other controllers are operating in said back-up operation and switches to said manual operation mode after finishing a current anti-skid control operation.

7. The anti-skid brake control system as set forth in claim 6, wherein said control module further comprises a fault alarm activated after all of the controllers have switched to the manual operation mode.

8. The anti-skid brake control system as set forth in claim 4, wherein said faulty sensor is one of said first and second sensors and wherein said first and second sensors are connected to respective first and second controllers via switching circuit means responsive to failure of at least one of said first and second sensors for changing from a normal first position to a second back-up state position, said switching circuit means connecting said first and second sensors to said corresponding first and second controllers in said first position, and in said second position, said switching circuit means connecting the controller corresponding to said faulty sensor to the other of said first and second sensors corresponding to a non-faulty sensor.

9. The anti-skid brake control system as set forth in claim 4, wherein each of said first, second and third controllers switches the corresponding brake circuit into the manual operation mode when the corresponding sensor fails.

10. The anti-skid brake control system as set forth in claim 8, wherein all of said controllers switch to said manual operation mode when one of said first and second sensors fails.

11. The anti-skid brake control system as set forth in claim 8, wherein all of said controllers switch to said manual operation mode upon failure of said third sensor.

12. The anti-skid brake control system as set forth in claim 11, wherein said control module further comprises a fault monitor activated when all of the controllers are switched to said manual operation mode.

13. An anti-skid brake control system for an automotive vehicle comprising:

a hydraulic brake system including wheel cylinders, one wheel cylinder associated with each of a driven and undriven vehicle wheels, first and second pressure control valves, each associated with one of the wheel cylinders associated with first and second undriven wheels, and a third pressure control valve associated with the wheel cylinders associated with said driven wheels, each of said first, second and third pressure control valves being operative to increase the fluid pressure in the corresponding wheel cylinder in a first position, to decrease the fluid pressure in said corresponding wheel cylinder in a second position and to hold the fluid pressure in said corresponding wheel cylinder constant in a third position;

a first wheel speed sensor producing first sensor signal pulses representative of the rotation speed of said first undriven wheel;

a second wheel speed sensor producing second sensor pulses representative of the rotation speed of said second undriven wheel;

a third wheel speed sensor producing third sensor signal pulses representative of the average rotation speed of said driven wheels;

a first controller associated with said first pressure control valve for controlling the latter, said first controller being responsive to said first sensor signal pulses to record an input timing of said first sensor signal pulses, to derive brake control variables including wheel speed and wheel acceleration for anti-skid brake control of said one of the undriven wheels, and to produce a first control signal which actuates said first pressure control valve to one of said first, second and third positions so as to adjust the rotation speed of said first undriven wheel toward an optimal relationship with the vehicle speed;

a second controller associated with said second pressure control valve for controlling the latter, said second controller being responsive to said second sensor signal pulses to record an input timing of said second sensor signal pulses, to derive brake control variables including wheel speed and wheel acceleration for anti-skid brake control of said the other undriven wheel, and to produce a second pressure control signal which actuates said second pressure control valve to one of said first, second and third positions so as to adjust the rotation speed of said second undriven wheel toward said optimal relationship to the vehicle speed;

a third controller associated with said third pressure control valve for controlling the latter, said third controller being responsive to said third sensor signal pulses to record an input timing of said third sensor signal pulses, to derive brake control variables including wheel speed and wheel acceleration for anti-skid brake control of said driven wheels, and to produce a third control signal which actuates said third pressure control valve to one of said first, second and third positions so as to adjust the rotational speed of said driven wheels toward said optimal relationship to the vehicle speed; and means, associated with said first, second and third controllers and responsive to failure of any one of said wheel speed sensors for performing a back-up operation in which the controller corresponding to the failing wheel speed sensor is operated for disabling anti-skid control and allow manual braking control immediately upon failure of the failing wheel speed sensor, and the other controllers are operated for disabling anti-skid control and allow manual braking control when said other controllers complete a current cycle of anti-skid control.

14. An anti-skid brake control system for an automotive vehicle comprising:

a hydraulic brake system including wheel cylinders one wheel cylinder associated with each of a driven and undriven vehicle wheels, first and second pressure control valves, each associated with one of the wheel cylinders associated with first and second undriven wheels, and a third pressure control valve associated with the wheel cylinders associated with said driven wheels, each of said first, second and third pressure control valves being operative to increase the fluid pressure in the corresponding wheel cylinders in a first position, to decrease the fluid pressure in said corresponding wheel cylinder in a second position and to hold the fluid pressure in said corresponding wheel cylinder constant in a third position;

a first wheel speed sensor producing first sensor signal pulses representative of the rotation speed of said first undriven wheel;

a second wheel speed sensor producing second sensor pulses representative of the rotation speed of said second undriven wheel;

a third wheel speed sensor producing third sensor signal pulses representative of the average rotation speed of said driven wheels;

a first controller associated with said first pressure control valve for controlling the latter, said first controller being responsive to said first sensor signal pulses to record an input timing of said first sensor signal pulses, to derive brake control variables including wheel speed and wheel acceleration for anti-skid brake control of said one of the undriven wheels, and to produce a first control signal which actuates said first pressure control valve to one of said first, second and third positions so as to adjust the rotation speed of said first undriven wheel toward an optimal relationship with the vehicle speed;

a second controller associated with said second pressure control valve for controlling the position of the latter, said second controller being responsive to said second sensor signal pulses to record an input timing of said second sensor signal pulses, to derive brake control variables including wheel speed and wheel acceleration for anti-skid brake control of said other undriven wheel, and to produce a second pressure control signal which actuates said second pressure control valve to one of said first, second and third positions so as to adjust the rotation speed of said second undriven wheel toward said optimal relationship with the vehicle speed; and a third controller associated with said third pressure control valve for controlling the position of the latter, said third controller being responsive to said third sensor signal pulses to record an input timing of said third sensor signal pulses, to derive brake control variables including wheel speed and wheel acceleration for anti-skid brake control of said driven wheels, and to produce a third control signal which actuates said third pressure control valve to one of said first, second and third positions so as to adjust the rotational speed of said driven wheels toward said optimal relationship with the vehicle speed;

a first switch interposed between said first wheel speed sensor and said first controller and further connected to said second wheel speed sensor, said first switch being operative to connect said first wheel speed sensor to said first controller in a first, normal position and to connect said second wheel speed sensor to said first controller in a second, back-up state position;

a second switch interposed between said second wheel speed sensor and said second controller and further connected to said first wheel speed sensor, said second switch being operative to connect said second wheel speed sensor to said second controller in a first, normal position and to connect said first wheel speed sensor to said second controller in a second, back-up state position; and a detector for detecting a failed one of said first, second and third wheel speed sensors and actuating said first, second and third controllers to operate in a back-up state, said detector operating one of said first and second switches in response to the failed wheel speed sensor to change said one switch from the first position to the second position thereof when said failed sensor corresponds to one of said first and second wheel speed sensors.

15. The anti-skid brake control system as set forth in claim 14, wherein said detector actuates said first, second and third controllers to operate in a manual operation mode, in which braking is controlled manually, when said failed sensor corresponds to said third wheel speed sensor.

16. The anti-skid brake control system as set forth in claim 15, wherein said first, second and third controllers continue anti-skid brake control operation after one of said first and second wheel speed sensors fail until after the current anti-skid control operation is completed.

17. An anti-skid method for controlling an automotive hydraulic brake system comprising the steps of:

detecting rotation speed of a first undriven wheel by means of a first wheel speed sensor;

detecting rotation speed of a second undriven wheel by means of a second wheel speed sensor;

detecting rotation speed of third driven wheels by means of a third wheel speed sensor;

deriving brake control variables for said first undriven wheel on the basis of the output of said first wheel speed sensor, deriving an optimal instantaneous brake pressure to apply to said first undriven wheel and controlling braking pressure to be applied to said first undriven wheel at the derived optimal pressure so that the slippage of said first undriven wheel can be held in an optimal value;

deriving brake control variables for said second undriven wheel on the basis of the output of said second wheel speed sensor, deriving an optimal instantaneous brake pressure to apply to said second undriven wheel and controlling braking pressure to be applied to said second undriven wheel at the derived optimal pressure so that the slippage of said second undriven wheel can be held in said optimal value;

deriving brake control variables for said third driven wheels on the basis of the output of said third wheel speed sensor, deriving an optimal instantaneous brake pressure to apply to said third driven wheels and controlling braking pressure to be applied to said third driven wheels at the derived optimal pressure so that the slippage of said third driven wheels can be held in said optimal value; and detecting a faulty one of said first, second and third wheel speed sensors and performing a predetermined back-up operation including disabling anti-skid brake control for one of said first, second and third wheels by disabling the derivation of the brake control signal based on the output of the faulty wheel speed sensor, continuing an on-going cycle of anti-skid brake control by allowing derivation of control signals based on the outputs of non-faulty wheel speed sensors, and subsequently disabling anti-skid control for all of the wheels, and thus allowing manual braking control when anti-skid control for all of the wheels after said on-going cycle of anti-skid control is terminated.

18. The method as set forth in claim 17, which further comprises a step for producing an alarm indicative of the disablement of anti-skid control after anti-skid brake control of all of the wheels has been disabled.

19. The method as set forth in claim 18, wherein disablement of anti-skid control for the wheel corresponding to the faulty wheel speed sensor is performed immediately upon failure of the wheel speed sensor.

20. The method as set forth in claim 18, in which said predetermined back-up operation includes the steps of deriving brake control variables for said first undriven wheel on the basis of the output of said second wheel speed sensor, deriving an approximated optimal instantaneous brake pressure to apply to said first undriven wheel and controlling braking pressure to be applied to said first driven wheel at said approximated optimal pressure, when said first wheel speed sensor has failed.

21. The method as set forth in claim 20, in which said predetermined back-up operation includes the steps of deriving brake control variables for said second undriven wheel on the basis of the output of said first wheel speed sensor, deriving an approximated optimal instantaneous brake pressure to apply to said second undriven wheel and controlling braking pressure to be applied to said second undriven wheel at said approximated optimal pressure, when said second wheel speed sensor has failed.

22. The method as set forth in claim 21, in which said predetermined back-up operation includes a step of disable anti-skid control of all of the wheels upon failure of said third wheel speed sensor.

* * * * *